US007694327B2

(12) United States Patent
Takashima et al.

(10) Patent No.: US 7,694,327 B2
(45) Date of Patent: Apr. 6, 2010

(54) INFORMATION PROCESSING APPARATUS, INFORMATION RECORDING MEDIUM, INFORMATION PROCESSING METHOD AND COMPUTER PROGRAM

(75) Inventors: Yoshikazu Takashima, Tokyo (JP); Satoshi Kitani, Tokyo (JP); Tomoyuki Asano, Kanagawa (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 876 days.

(21) Appl. No.: 10/948,468

(22) Filed: Sep. 22, 2004

(65) Prior Publication Data
US 2005/0105727 A1 May 19, 2005

(30) Foreign Application Priority Data
Oct. 15, 2003 (JP) ............................ P2003-354967

(51) Int. Cl.
*G06F 7/04* (2006.01)
(52) U.S. Cl. ......................................................... 726/2
(58) Field of Classification Search ...................... 726/2
See application file for complete search history.

(56) References Cited

U.S. PATENT DOCUMENTS

| 5,448,420 | A | * | 9/1995 | Henits et al. .................. 360/48 |
| 5,572,589 | A | * | 11/1996 | Waters et al. .................. 705/58 |
| 6,047,103 | A | * | 4/2000 | Yamauchi et al. .............. 386/94 |
| 6,327,652 | B1 | * | 12/2001 | England et al. ................. 713/2 |
| 6,823,454 | B1 | * | 11/2004 | Hind et al. .................. 713/168 |
| 7,031,472 | B1 | * | 4/2006 | Noda ......................... 380/232 |
| 2003/0084295 | A1 | * | 5/2003 | Xie et al. ..................... 713/170 |
| 2004/0163011 | A1 | * | 8/2004 | Shaw .......................... 714/25 |
| 2005/0050208 | A1 | * | 3/2005 | Chatani ...................... 709/229 |

FOREIGN PATENT DOCUMENTS

| JP | 2000-348003 | 12/2000 |
| JP | 2000-357126 | 12/2000 |
| JP | 2001-118329 | 4/2001 |

* cited by examiner

*Primary Examiner*—Nasser G Moazzami
*Assistant Examiner*—Michael S McNally
(74) *Attorney, Agent, or Firm*—K&L Gates LLP

(57) ABSTRACT

An information processing apparatus and method are provided. The information processing apparatus and method provides an attribute of a component which executes a process of reading data from an information recording medium is confirmed so that severe authentication corresponding to contents can be achieved. In authentication of a component which attempts to perform a process of data read from an information recording medium, it is confirmed whether or not an attribute of the component has a data process permission component attribute set in advance. For example, it is confirmed through the attribute confirmation whether the component is a hardware component or a software component, and only when the component is a hardware component, a process of the contents is permitted.

23 Claims, 15 Drawing Sheets

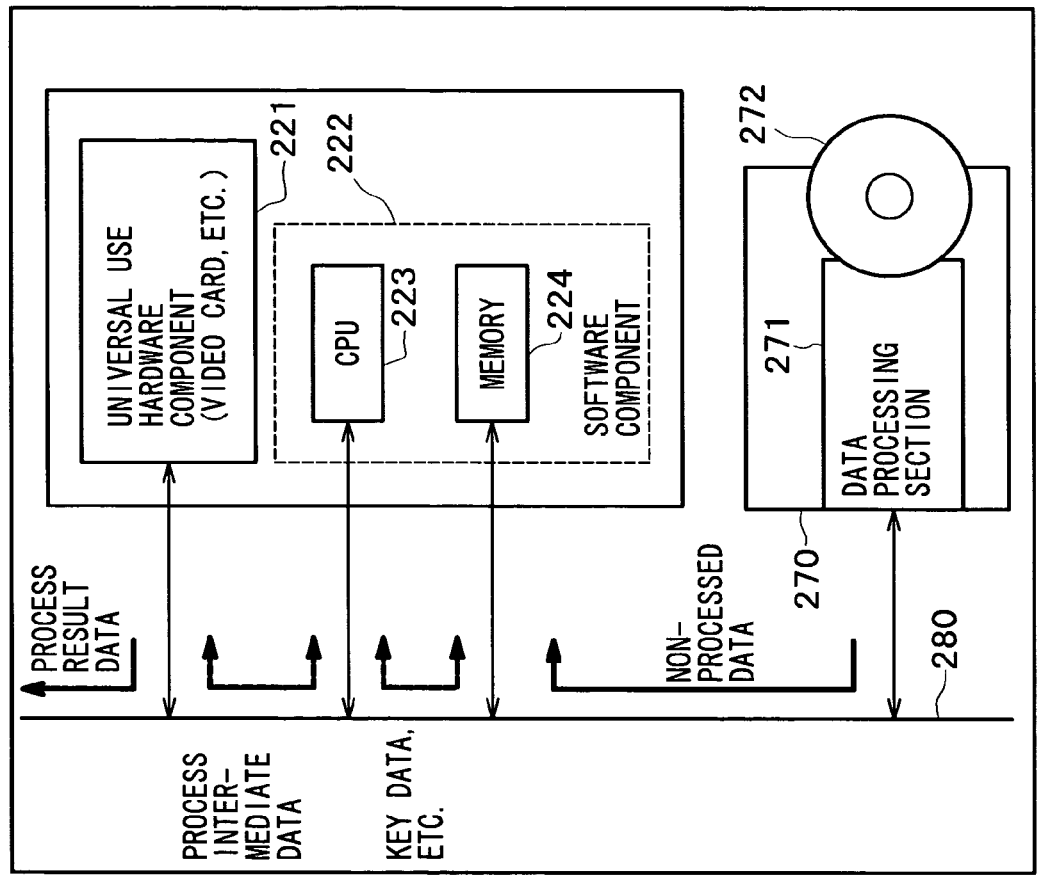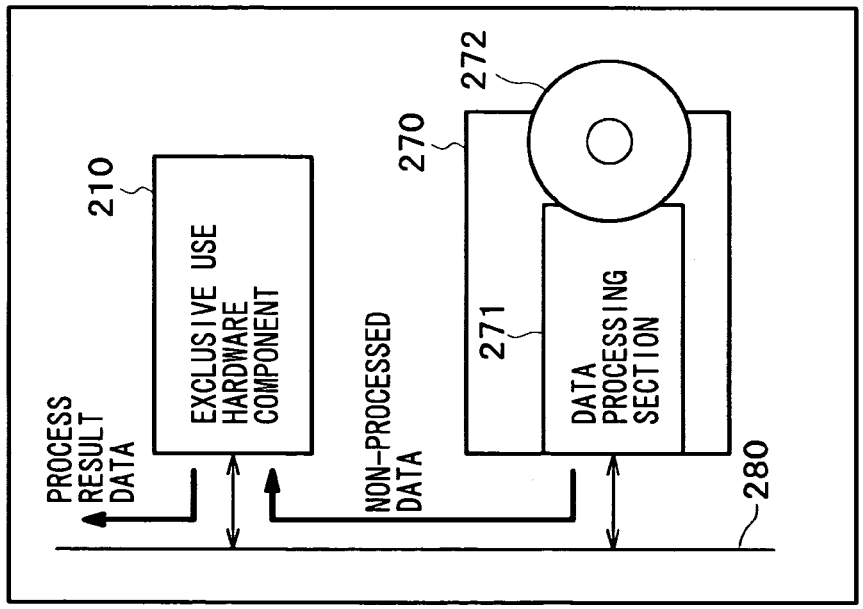

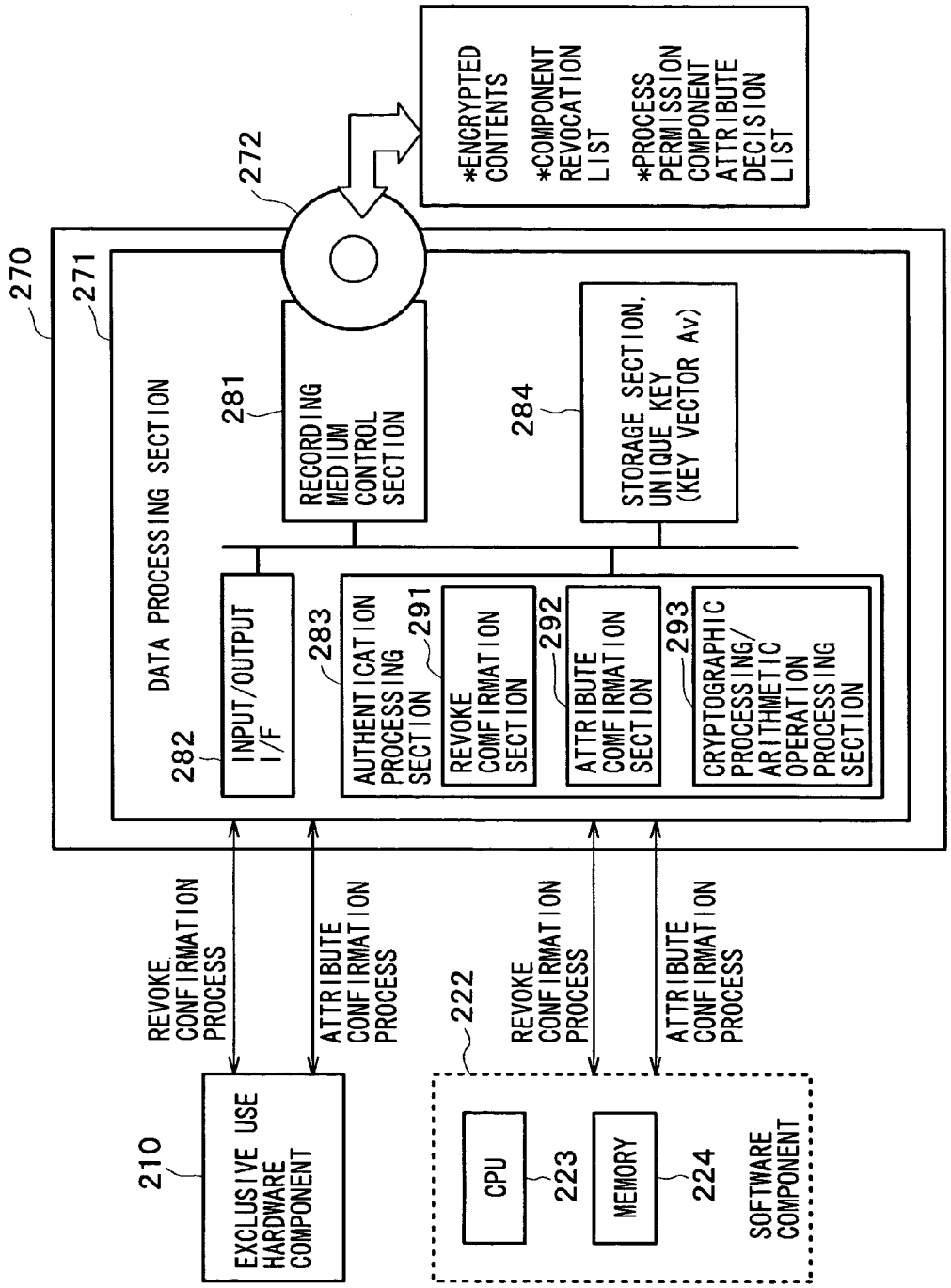

FIG. 4

CRL : COMPONENT REVOCATION LIST

|  | ILLEGAL COMPONENT ID |
|---|---|
| 00001 | abc34234cd2 |
| 00002 | a1c47dd2a23 |
| 00003 | 2a47c2ca343 |
| ⋮ | ⋮ |
| nnnnn | 656ef213ea5 |

FIG. 5A

PROCESS PERMISSION COMPONENT ATTRIBUTE DECISION LIST

| | COMPONENT ID | COMPONENT ATTRIBUTE | PERMISSION INFORMATION |
|---|---|---|---|
| 00001 | xxxxx222xxx-xxxxx555xxx | HARDWARE COMPONENT | YES |
| 00002 | xxxxx777xxx-xxxxx888xxx | SOFTWARE COMPONENT | NO |

FIG. 5B

PROCESS PERMISSION COMPONENT ATTRIBUTE DECISION LIST

| | COMPONENT ID | COMPONENT ATTRIBUTE | PERMISSION INFORMATION |
|---|---|---|---|
| 00001 | xxxxx222xxx-xxxxx555xxx | HARDWARE COMPONENT OF MAKER A | YES |
| 00002 | xxxxx556xxx-xxxxx666xxx | HARDWARE COMPONENT OF MAKER B | YES |
| 00003 | xxxxx667xxx-xxxxx699xxx | HARDWARE COMPONENT OF OTHERS | NO |
| 00004 | xxxxx777xxx-xxxxx888xxx | SOFTWARE COMPONENT | NO |

FIG. 6

EXAMPLES OF COMPONENT ATTRIBUTE FOR PROCESS PERMISSION COMPONENT DECISION

| COMPONENT ATTRIBUTE EXAMPLE | EXPLANATION |
|---|---|
| COMPONENT CATEGORY | SOFTWARE PROGRAM = COMPONENT ID:11xxxxxxxxx~18xxxxxxxxx<br>VIDEO CARD = COMPONENT ID:21xxxxxxxxx~25xxxxxxxxx<br>AUDIO CARD = COMPONENT ID:32xxxxxxxxx~37xxxxxxxxx<br>DRIVE APPARATUS = COMPONENT ID:51xxxxxxxxx~62xxxxxxxxx<br>. . |
| COMPONENT MAKER | ID UNIQUE TO MAKER, ACQUIRED BY LICENSING AGREEMENT<br>MAKER A = COMPONENT ID:xx222xxxxxx~xx333xxxxxx<br>MAKER B = COMPONENT ID:xx444xxxxxx~xx555xxxxxx<br>. . |
| COMPONENT MODEL | USED WHERE ONE MAKER PRODUCES A PLURALITY OF MODELS<br>MODEL 001 = COMPONENT ID:xxxxx555xxxx~xxxxx666xxxx<br>MODEL 002 = COMPONENT ID:xxxxx777xxxx~xxxxx888xxxx<br>. . |
| COMPONENT VERSION | VERSION OF PROGRAM, VERSION OF FIRMWARE PLACED IN HARDWARE, ETC.<br>VERSION 001 = COMPONENT ID:xxxxxxxx01xx<br>VERSION 002 = COMPONENT ID:xxxxxxxx02xx<br>. . |
| COMPONENT PRODUCTION TIMING | DISCRIMINATE PRODUCTION TIMING OF COMPONENT BASED ON COMPONENT ID |
| COMPONENT VERSION OF COMPLYING STANDARDS | FOR EXAMPLE<br>COMPLY WITH Ver1.00 OF Blu-ray DISK STANDARDS = COMPONENT ID:xxxxxxxxx01<br>COMPLY WITH Ver2.00 OF Blu-ray DISK STANDARDS = COMPONENT ID:xxxxxxxxx02 |

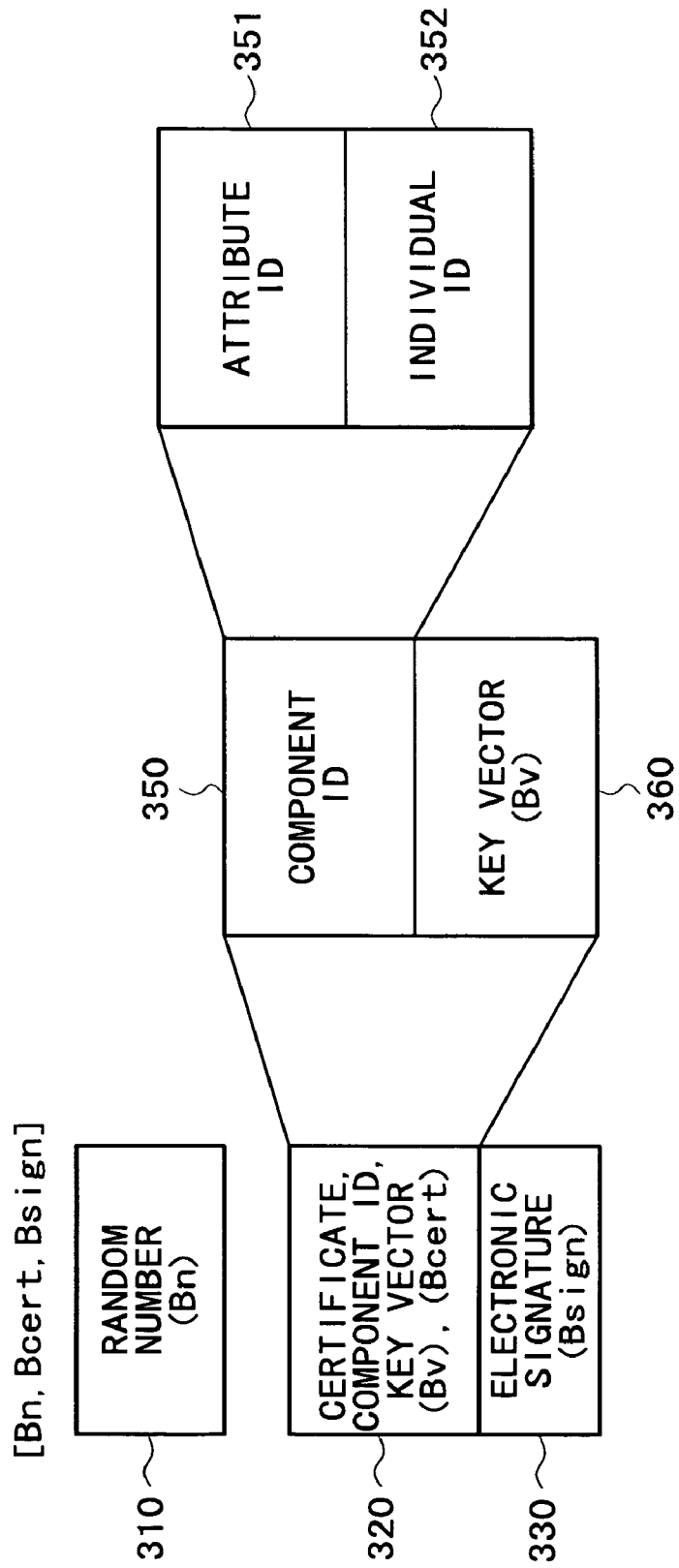

FIG. 11A

PROCESS PERMISSION COMPONENT DECISION LIST (REVOCATION LIST (CRL) & PROCESS PERMISSION COMPONENT ATTRIBUTE DECISION LIST)

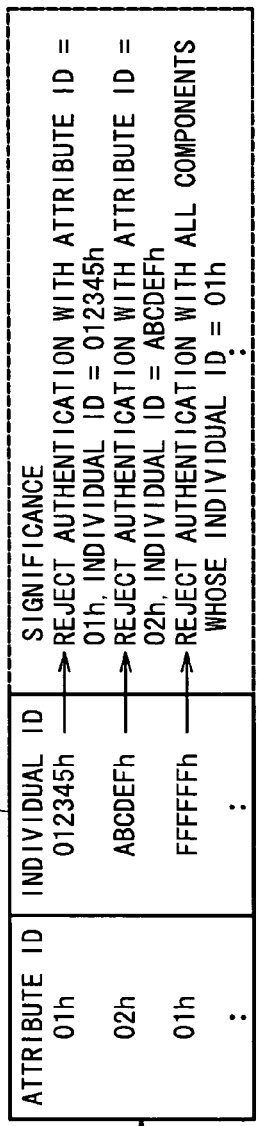

401

| ATTRIBUTE ID | INDIVIDUAL ID | SIGNIFICANCE |
|---|---|---|
| 01h | 012345h | → REJECT AUTHENTICATION WITH ATTRIBUTE ID = 01h, INDIVIDUAL ID = 012345h |
| 02h | ABCDEFh | → REJECT AUTHENTICATION WITH ATTRIBUTE ID = 02h, INDIVIDUAL ID = ABCDEFh |
| 01h | FFFFFFh | → REJECT AUTHENTICATION WITH ALL COMPONENTS WHOSE INDIVIDUAL ID = 01h |
| .. | .. | .. |

WHERE INDIVIDUAL ID = FFFFFFh, AUTHENTICATION WITH ALL APPARATUS HAVING ATTRIBUTE DESIGNATED WITH ATTRIBUTE ID IS REJECTED

FIG. 11B

PROCESS PERMISSION COMPONENT REVOCATION LIST (CRL)

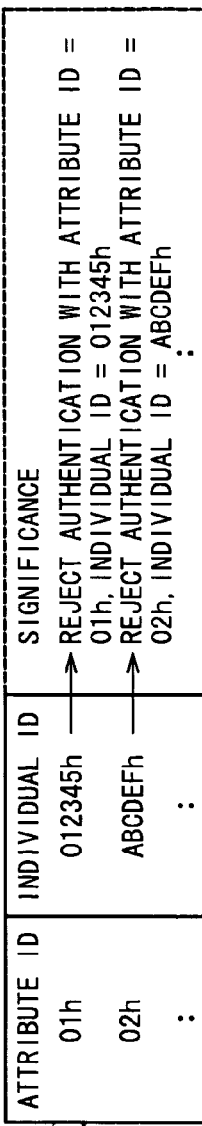

402

| ATTRIBUTE ID | INDIVIDUAL ID | SIGNIFICANCE |
|---|---|---|
| 01h | 012345h | → REJECT AUTHENTICATION WITH ATTRIBUTE ID = 01h, INDIVIDUAL ID = 012345h |
| 02h | ABCDEFh | → REJECT AUTHENTICATION WITH ATTRIBUTE ID = 02h, INDIVIDUAL ID = ABCDEFh |
| .. | .. | .. |

(B-1) EXAMPLE OF LIST SETTING WHEREIN ATTRIBUTE IDs FOR WHICH PROCESS IS PERMITTED ARE LISTED

PROCESS PERMISSION COMPONENT ATTRIBUTE DECISION LIST

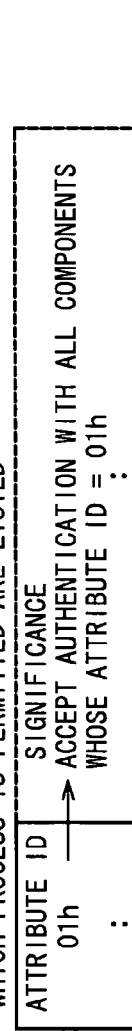

403

| ATTRIBUTE ID | SIGNIFICANCE |
|---|---|
| 01h | → ACCEPT AUTHENTICATION WITH ALL COMPONENTS WHOSE ATTRIBUTE ID = 01h |
| .. | .. |

(B-2) EXAMPLE OF LIST SETTING WHEREIN ATTRIBUTE IDs FOR WHICH PROCESS IS NOT PERMITTED ARE LISTED

404

| ATTRIBUTE ID | SIGNIFICANCE |
|---|---|
| 02h | → ACCEPT AUTHENTICATION WITH ALL COMPONENTS WHOSE ATTRIBUTE ID = 02h |
| .. | .. |

ONE OF METHODS OF (B-1) AND (B-2) IS USED TO PERFORM AUTHENTICATION MANAGEMENT FOR INDIVIDUAL ATTRIBUTES

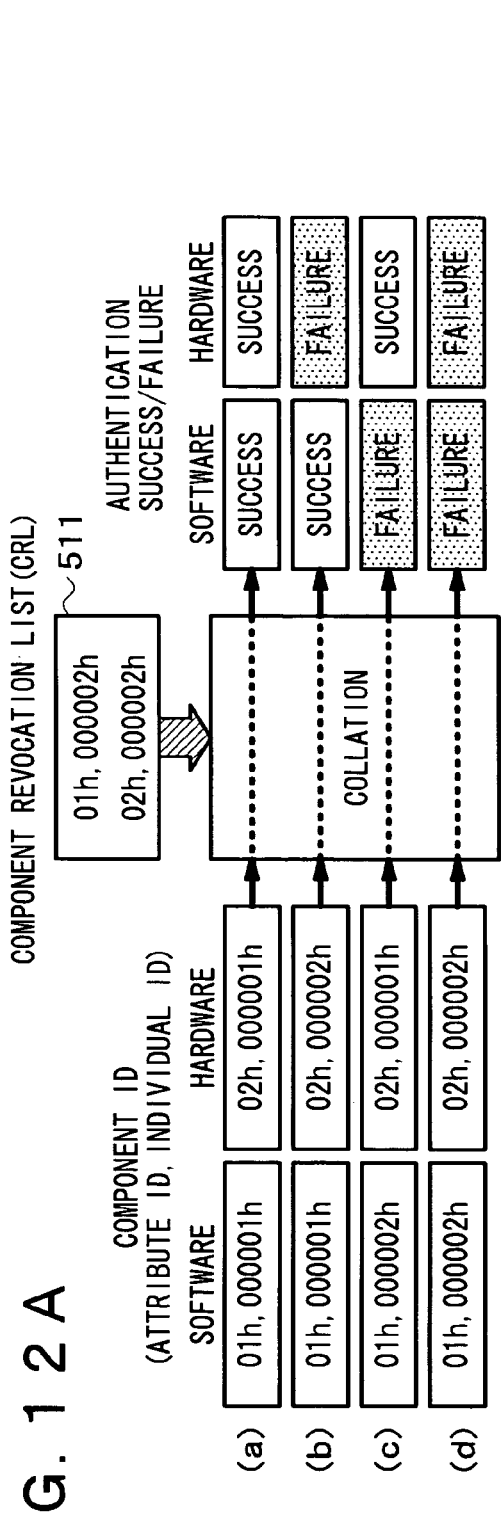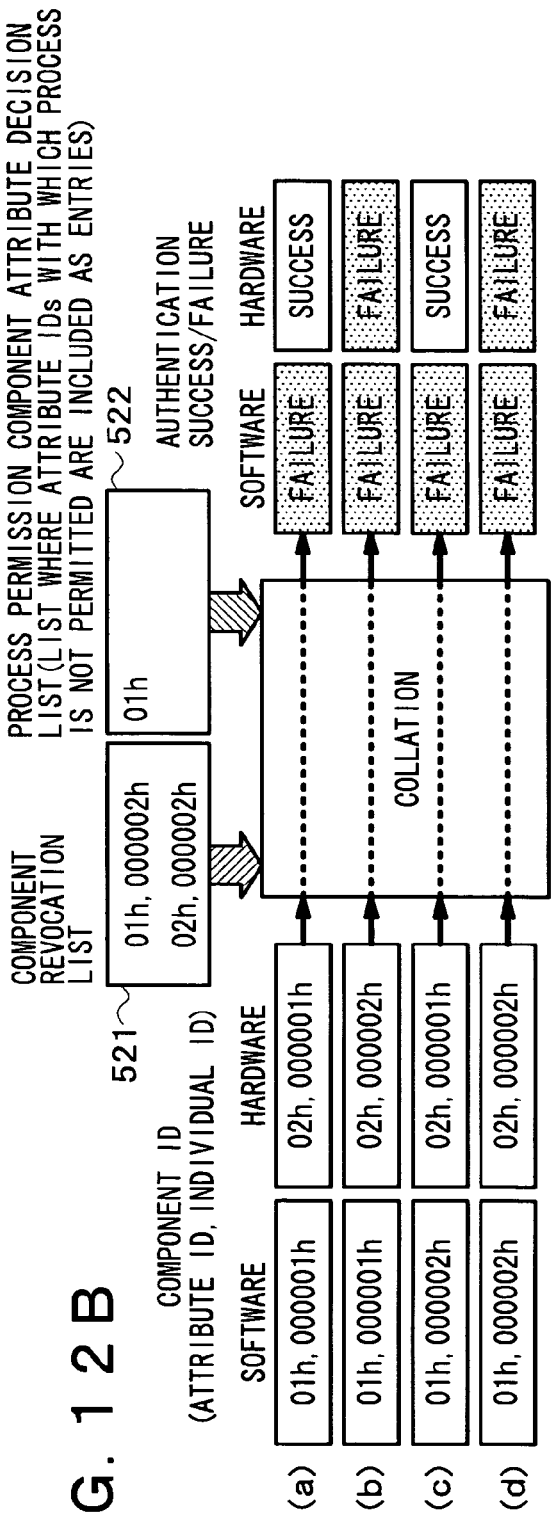

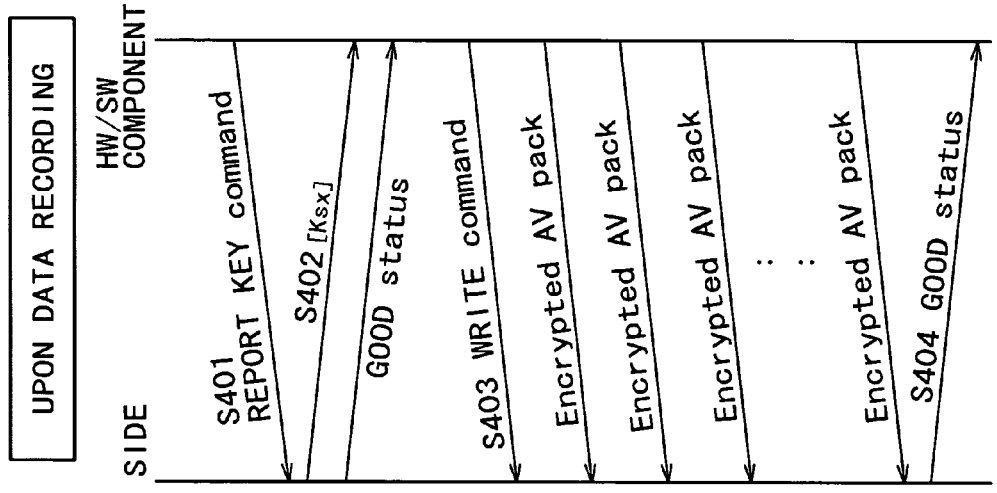
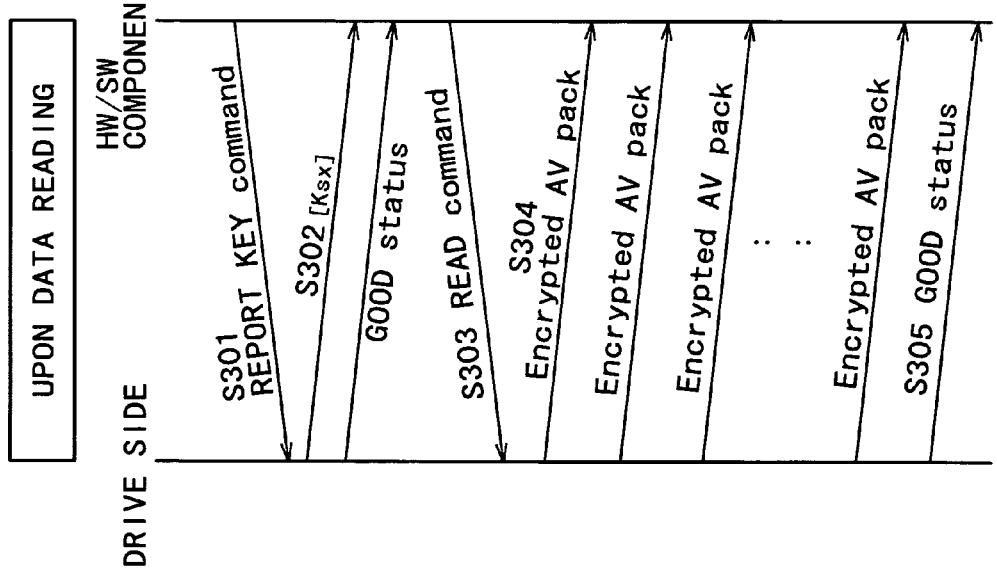

INFORMATION PROCESSING APPARATUS, INFORMATION RECORDING MEDIUM, INFORMATION PROCESSING METHOD AND COMPUTER PROGRAM

CROSS REFERENCE TO RELATED APPLICATIONS

This application claims priority to Japanese Patent Application No. P2003-354967, filed on Oct. 15, 2003, the disclosure of which is incorporated by reference herein.

BACKGROUND OF THE INVENTION

The present invention relates to an information processing apparatus, an information recording medium, an information processing method and a computer program. More specifically, the present invention relates to an information processing apparatus, an information recording medium, an information processing method and a computer program wherein an authentication process is executed for permitting a reliable component to execute various data processes for utilization of contents such as a decryption process for encrypted contents recorded on an information recording medium.

In recent years, various disks which can record a large amount of data such as a DVD (Digital Versatile Disc) and a blue laser disk (Blu-ray Disc) have been developed and placed into practical use to allow storage and reproduction of high definition images and high quality sound as a large amount of data. Further, as reproduction environment of such large capacity recording media, not only conventional recording and reproduction apparatus for consumers, but also personal computers (PCs) which incorporate a high performance central processing unit (CPU) or a video card and various other information reproduction apparatus have been developed and placed into practical use.

One of problems where contents are reproduced, for example, on a PC is protection of the copyright of the contents. Usually, the right of distribution or like right to most contents such as music data and image data is owned by a creator or a seller of the contents. Accordingly, such contents as mentioned above are normally configured such that, when the contents are distributed, fixed limitation to the utilization of the contents is applied such that utilization of the contents is permitted only to illegal users so that duplication or the like of the contents which is not permitted may not be performed.

Particularly, where a digital recording apparatus and recording medium are used, recording and reproduction can be repeated without any deterioration of the image and sound quality, and this gives rise to such various problems as distribution of illegally copied contents through the Internet and distribution of pirated edition disks which are recording media such as a CD-R or a DVD on which contents are copied.

A large capacity recording medium such as a DVD or a blue laser disk has various video information and music information, which make an object of protection of the copyright, recorded as digital data thereon and is distributed as such on the market. Where it is intended to distribute such a medium on which digital data is recorded as just described on the market, it is essentially required to take a countermeasure for prevention of illegal copying to achieve protection of the owner of the copyright.

Actually, however, the system for preventing illegal copying is incomplete as can be recognized from the fact that a tool which makes it possible for a PC to decrypt contents recorded on a recording medium complying, for example, with the DVD-Video standards is distributed on the Internet.

Further, where a reproduction program is executed under the control of a CPU of a PC to execute a contents reproduction process, contents, cryptographic key generation information and so forth recorded as encrypted data on a disk such as a DVD loaded in a drive of the PC are stored into a memory of the PC through an interface of the drive and a general purpose bus of the PC.

Further, a generation process of a decryption key for the encrypted contents, a decryption process of the contents with the generated key, a decoding process of MPEG compressed contents and so forth are executed in accordance with the reproduction program executed by the CPU. Key information, intermediate data and so forth generated during the processes are transferred at individual processing timings through the general purpose bus of the PC and stored into the general purpose memory.

When the PC executes the contents reproduction program to perform a contents data process in which the general purpose bus, the general purpose memory and so forth of the PC are used in this manner, digital AV stream data or cryptographic key information in a decrypted state which is generated in the data processing process comes to exist on the memory or the general purpose bus of the PC even temporarily. This gives rise to the possibility of exploitation of data in the contents processing process, resulting in a problem that illegal copying of the contents is allowed.

The following countermeasure has been proposed to solve such problems as described above.

In particular, authentication is performed between a drive in which a disk is loaded and a component (hardware apparatus, reproduction software and so forth are collectively referred to as components) which executes a contents process. Then, a temporary cryptographic key generated upon such authentication is used to encrypt contents to be transmitted between the drive and the component, and the encrypted contents is transferred. As a result, illegal acquisition of the contents by an illegal apparatus which cannot establish authentication can be prevented.

The process described makes it possible to select a component which is to execute a process of contents under the condition that the authentication results in success, and eliminates intervention of an illegal component thereby to prevent exploitation of data by an illegal apparatus.

However, an owner of the copyright or the right of distribution of contents sometimes wants a contents process only by a further limited component. For example, if a software program causes an encrypted contents process to be executed on a PC, then a decryption processing program is executed as a process of the CPU which executes processing under the control of a general purpose operating system (OS), and there is the possibility that intermediate data, key data and result data generated during the process may be stored into the general purpose memory of the PC as described hereinabove. The possibility that such data may be exploited cannot be denied.

In the authentication process described above, if a component has predetermined information necessary for the authentication, then the authentication can result in success irrespective of whether the component is a hardware component or a software component. As a result, intermediate data, key data and result data are stored into the general purpose memory of the PC and a process of contents transferred on the general purpose bus is allowed.

In order to execute a contents process more securely, it is preferable to execute a contents process within a closed particular hardware component for exclusive use which does not make use of a general purpose CPU, a memory or a general purpose bus.

SUMMARY OF THE INVENTION

The present invention relates to an information processing apparatus, an information recording medium, an information processing method and a computer program. More specifically, the present invention relates to an information processing apparatus, an information recording medium, an information processing method and a computer program wherein an authentication process is executed for permitting a reliable component to execute various data processes for utilization of contents such as a decryption process for encrypted contents recorded on an information recording medium.

The present invention provides in an embodiment an information processing apparatus, an information recording medium, an information processing method and a computer program by which an improved contents leakage preventing effect can be achieved.

According to an embodiment of the present invention, where a component authentication is executed and a process permission component for contents is specified under the condition that the authentication results in success, an attribute confirmation process of a component is executed upon an authentication process, and only when it is confirmed that the component has an attribute determined in advance, a process of the contents by the component is permitted.

According to an embodiment of the present invention, there is provided an information processing apparatus including a drive for executing a reading process of data recorded on an information recording medium loaded therein, a component or components for executing a data process for the data read from the information recording medium and inputted from the drive, the drive including an authentication processing section for executing a confirmation process of a component attribute, and a data outputting section for executing a process of outputting the data read from the information recording medium loaded in the drive to any of the components under the condition that it is confirmed that the component attribute of the component confirmed by the authentication processing section has a data process permission component attribute set in advance.

According to another embodiment of the present invention, there is provided an information recording medium having recorded thereon contents and data process permission component attribute information which is attribute information of a component which is permitted to perform a data process for the contents.

According to a further embodiment of the present invention, there is provided an information processing method for executing authentication of and data outputting process control to any of components which tries to perform a process of data read from an information recording medium, comprising a component authentication step executed by a drive in which an information recording medium on which output object data is recorded is loaded, and a data outputting step of outputting the data read from the information recording medium from the drive to the component under the condition that the component authentication results in success, the component authentication step including an attribute confirmation step of confirming whether or not an attribute of any of the components which is an object of the authentication process has a data process permission component attribute set in advance, the component authentication step executing the authentication process under the condition that the authentication results in success if the attribute of the authentication process object component has the data process permission component attribute set in advance.

According to a still further embodiment of the present invention, there is provided a computer program for executing authentication of and data outputting process control to any of components which tries to perform a process of data read from an information recording medium, comprising a component authentication step executed by a drive in which an information recording medium on which output object data is recorded is loaded, and a data outputting step of outputting the data read from the information recording medium from the drive to the component under the condition that the component authentication results in success, the component authentication step including an attribute confirmation step of confirming whether or not an attribute of any of the components which is an object of the authentication process has a data process permission component attribute set in advance, the component authentication step executing the authentication process under the condition that the authentication results in success if the attribute of the authentication process object component has the data process permission component attribute set in advance.

It is to be noted that the computer program according to an embodiment the present invention can be provided through a computer-readable storage medium such as a recording medium such as, for example, a CD, an FD or an MO or through a communication medium such as a network, for example, to a computer system which can execute various program codes. By providing the program in a computer-readable fashion, a process based on the program is implemented on the computer system.

With the information processing apparatus, information recording medium, information processing method and computer program, in authentication of a component which tries to perform a process of data read from an information recording medium, an attribute confirmation process of confirming whether or not an attribute of the component has a data process permission component attribute set in advance, and it is used as the condition for establishment of the authentication that the attribute of the authentication process object component has the data process permission component attribute set in advance. Consequently, for example, only where the component is a hardware component, it is possible to permit the component to execute the data process of contents and so forth. Where software components are excluded from the process permission component in this manner, the possibility that data whose leakage must be prevented such as intermediate data, key data and digital contents which are generated upon a contents process in a general purpose memory or a general purpose bus provided in a PC or the like may be outputted or stored is reduced. Consequently, utilization and reproduction processes of contents having a high degree of security can be achieved. Accordingly, the present invention can be utilized for an information processing apparatus such as a PC utilizing contents which requires protection of the copyright and an information recording medium stored the contents thereon.

Further, an information recording medium having contents recorded thereon has further recorded thereon attribute information of a component which is permitted to perform a data process for the contents, and the drive in which the information recording medium is loaded reads the data process permission component attribute information from the information recording medium and executes the attribute confirmation and the authentication of the component based on the thus read information. Consequently, it is possible to set a data processing component in accordance with the data process permission component attribute information determined arbitrarily by a person who provides the contents. Particularly, such various settings in accordance with the contents are possible as to set only a hardware component as the data process permission component attribute, to set only a software component as the data process permission component attribute, and to set both of a hardware component and a software component as the data process permission component attributes. Accordingly, the present invention can be utilized for an information processing apparatus such as a PC utilizing contents which requires protection of the copyright and an information recording medium stored the contents thereon.

Additional features and advantages of the present invention are described in, and will be apparent from, the following Detailed Description of the Invention and the figures.

BRIEF DESCRIPTION OF THE FIGURES

FIGS. 2A and 2B are diagrammatic views illustrating different forms of processing executed by the information processing apparatus when contents read out from an information recording medium are processed by components.

FIG. 3 is a block diagram showing a configuration of a drive apparatus which composes the information processing apparatus and illustrating an authentication process between the drive and a component.

FIG. 4 is a view illustrating an example of a component revocation list applied in the authentication processes between the drive apparatus and a component.

FIGS. 5A and 5B are views illustrating different examples of a process permission component attribute decision list applied in the authentication processes between the drive apparatus and a component.

FIG. 6 is a view illustrating an example of component attributes which can be set in the process permission component attribute decision list.

FIG. 9 is a diagrammatic view illustrating data presented to the drive by a component in the authentication process.

FIGS. 11A and 11B are views illustrating different examples of the component revocation list and the process permission component attribute decision list used in the authentication process and examples of a decision process based on a component ID.

FIGS. 12A and 12B are diagrammatic views illustrating particular collation processes and decision results based on a component ID in the authentication process.

FIGS. 15A and 15B are diagrams illustrating transfer commands and transfer data between the drive and a component in the data reading and transfer process from an information recording medium and the transfer process sequence of write data after authentication between the drive and a component results in success.

DETAILED DESCRIPTION OF THE INVENTION

The present invention relates to an information processing apparatus, an information recording medium, an information processing method and a computer program. More specifically, the present invention relates to an information processing apparatus, an information recording medium, an information processing method and a computer program wherein an authentication process is executed for permitting a reliable component to execute various data processes for utilization of contents such as a decryption process for encrypted contents recorded on an information recording medium.

First, an example of a configuration of an information processing apparatus which executes a data process according to an embodiment of the present invention. It is to be noted that the data process executed by the information processing apparatus of the present invention is a data process involved in a decoding process and a reproduction process of data read out from various information recording media such as a DVD and a blue laser disk. Data which may be an object of the data process includes not only contents entity data but also a cryptographic key to be applied in decryption of contents and various kinds of associated information associated with contents such as a cryptographic key, contents utilization condition information, a play list and a reproduction program, and associated programs.

Figure 1:
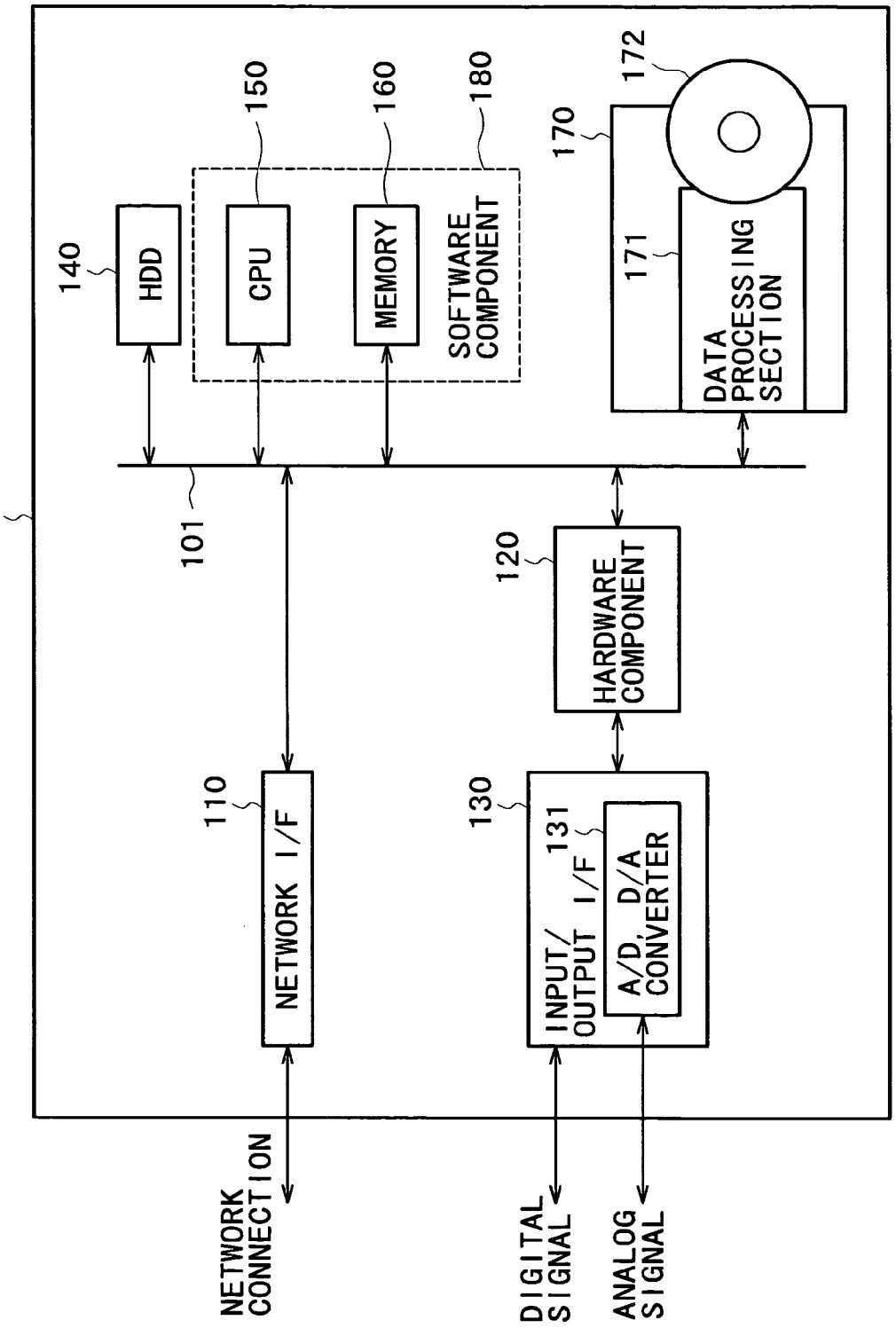
FIG. 1 is a block diagram showing an example of a configuration of an information processing apparatus according to an embodiment of the present invention.

FIG. 1 shows a configuration of an embodiment of an information processing apparatus 100 which executes the data process described above. Referring to FIG. 1, the information processing apparatus 100 shown includes a network interface (I/F) 110, a hardware component 120, an input/output interface (I/F) 130 including an A/D, D/A converter 131, a hard disk driver (HDD) 140, a CPU (Central Processing Unit) 150, a memory 160, and a drive 170 into which an information recording medium 172 such as a DVD or a blue laser disk can be loaded. The drive 170 includes a data processing section 171 for executing an authentication process between components and data inputting/outputting control.

The blocks shown in FIG. 1 are interconnected by a bus 101 so that data and a command can be transferred between the blocks. The bus 101 may be a general purpose bus such as, for example, a PCI bus or a high speed bus for exclusive use for graphics such as an AGP bus, and a suitable one of such methods is selectively used in accordance with an application.

Data processes when reproduction of AV stream data recorded on the information recording medium 172 is performed include a series of cryptographic processes executed by the drive 170 such as generation of a key to be applied in decryption of encrypted contents read out from the information recording medium 172 and a decryption process of the encrypted contents based on the generated key.

Further, where the data recorded on the information recording medium 172 is multiplexed data of various data such as video data, audio data and caption data, a process of demultiplexing and extracting the video data, audio data and caption data from the multiplexed data, that is, an MPEG-ES (elementary stream) extraction process, is executed. Furthermore, a decoding process of the demultiplexed extracted video, audio and caption data such as, for example, an MPEG decoding process, is executed.

Contents data acquired as a result of the decoding process is outputted from the input/output interface 130. It is to be noted that the input/output interface 130 has a configuration which can output one or both of a digital signal output and an analog signal output. An output signal of the input/output interface 130 is outputted to a monitor, a speaker, an AV amplifier or the like not shown so that display or reproduction of the contents may be performed.

As described hereinabove, when reproduction of AV stream data recorded on the information recording medium 172 is performed, various processes including (a) a cryptographic process involved in decryption of encrypted contents, generation of a key for decryption of the contents and so forth, (b) a demultiplexing extraction process of video, audio and caption data (an extraction process of an MPEG-ES (elementary stream), and (c) a decoding process.

Devices for executing the processes mentioned differ depending upon the configuration of the information processing apparatus (for example, a PC) which executes reproduction of the information recording medium. Where the information processing apparatus includes hardware components for exclusive use ready for the AV stream format on the information recording medium and the encryption system, a particular hardware component for exclusive use can execute the three processes (a), (b) and (c) described above.

In particular, where the hardware component 120 shown in FIG. 1 is a hardware component for exclusive use, all of the processes including (a) various cryptographic processes involved in a decryption process of encrypted contents, (b) a demultiplexing extraction process of video, audio and caption data (extraction process of an MPEG-ES (elementary stream), and (c) a decoding process can be executed in the inside of the hardware component 120.

Where no such hardware component for exclusive use is available, a software component and a hardware component (a video card, a sound card and so forth) cooperatively execute the processes (a) to (c) described above.

In particular, where the hardware component 120 shown in FIG. 1 is not a hardware component for exclusive use which executes all of the processes (a) to (c) described above, the processes (a) to (c) are executed by cooperative processes between a software component 180 shown in FIG. 1 and the hardware component 120 which includes a video card, a sound card and/or a like element.

It is to be noted here that the software component 180 is a component which executes a computer program for executing at least one of the processes including (a) the various cryptographic processes involved in a decryption process of encrypted contents, (b) the demultiplexing extraction process of video, audio and caption data (extraction process of an MPEG-ES (elementary stream), and (c) the decoding process or part of the processes and includes software as a computer program in which an execution sequence of the processes is set and a hardware configuration of the CPU 150, memory 160 and so forth as general purpose hardware for executing the computer program.

In a process in which a software component is applied, a data processing program (software) which can be executed, for example, on a general purpose OS for a PC executes processing control of the processes (a) to (c) described above. Accordingly, although hardware such as the CPU 150 and the memory 160 is involved, since the entity as a main body of control is software, such a component as just described is called software component.

If a hardware component for exclusive use can execute all of the processes (a) to (c) described above, then intermediate data which is generated upon processing of encrypted contents, cryptographic key data and decrypted digital contents data are not stored into a general purpose memory 160 of the information processing apparatus at all. Consequently, the possibility that such information may leak to the outside can be reduced.

However, where such a hardware component for exclusive use as described above is not available, a software component and various hardware components (a video card, a sound card and so forth) cooperatively execute the processes (a) to (c) described above. In this instance, intermediate data which is generated upon processing of encrypted contents or cryptographic key data is sometimes transferred through the general purpose bus 101 of the information processing apparatus or stored into the general purpose memory 160. Therefore, the possibility that the information may leak to the outside is higher.

Processes executed by hardware components for exclusive use and contents processes cooperatively executed by a software component and various hardware components (a video card, a sound card and so forth) are described with reference to FIGS. 2A and 2B.

FIG. 2A shows a contents data processing configuration by a hardware component 210 for exclusive use while FIG. 2B shows a contents data processing configuration cooperatively executed by a software component 222 and a hardware component (a video card, a sound card or the like) 221.

In the configuration of FIG. 2A, non-processed data including encrypted data read out from an information recording medium 272 is inputted through a bus 280 to the hardware component 210 for exclusive use. Thus, the hardware component 210 for exclusive use executes the processes described hereinabove, that is, (a) the various cryptographic processes involved in a decryption process of encrypted contents, (b) the demultiplexing extraction process of video, audio and caption data (extraction process of an MPEG-ES (elementary stream), and (c) the decoding process.

Data of a result of the processes is transferred to an input/output interface not shown through the bus 280 and then outputted to the outside. In the configuration shown in FIG. 2A, intermediate data generated during processing of the encrypted contents or cryptographic key data is not transferred through the bus 280 of the information processing apparatus or stored into a general purpose memory. Thus, the possibility that the information may be leak to the outside is low.

On the other hand, in the configuration shown in FIG. 2B, non-processed data including encrypted contents read out from the information recording medium 272 by a drive 270 is inputted to the software component 222 or hardware component 221, which is formed from a video card, a sound card or the like, through a bus 280. In the software component 222, a data processing program (software) is executed under the control of a CPU 223, and the software component 222 and the hardware component 221 cooperated with each other execute the processes (a) to (c) described above.

In a process in which the software component 222 is applied, the processing control of the processes (a) to (c) described above is performed by a data processing program (software) which can be executed, for example, on a general purpose OS for a PC.

In this instance, intermediate data which is generated during a process of encrypted contents or cryptographic key data is sometimes transferred through the bus 280 of the information processing apparatus or stored into the general purpose memory 224. This gives rise to a problem of increase of the possibility that information may leak to the outside by acquisition of data on the bus 280 or acquisition of data of a memory 224.

The present invention eliminates the problem just described and executes attribute confirmation of a component in an authentication process where authentication of the component which tries to execute a process of contents, such as the processes (a) to (c) described hereinabove, is executed by a drive.

The drive executes attribute confirmation in an authentication process of a component to be used for a process of contents and, only when it is confirmed in the attribute confirmation that the component has a component attribute permitted in advance, the drive permits the process of the contents and outputs the processing object contents, that is, contents read out from an information recording medium, only to the component which has the limited attribute.

More particularly, a drive apparatus which is loaded with an information recording medium and executes reading of data from the information recording medium executes a revoke confirmation process based on a component revocation list set as a list of illegal components in an authentication process of any component which executes a data process of contents and executes a confirmation process of a component attribute. Only when it is confirmed that the following two conditions (a) that the component is not a revoke component to be excluded and (b) that the component attribute has a predetermined attribute are satisfied, the drive apparatus permits the contents process by the component and outputs data including the contents read from the information recording medium to the component.

The component authentication process executed by the information processing apparatus of the present invention is described with reference to FIG. 3. The drive 270 loaded with an information recording medium 272 to execute reading of data from the information recording medium 272 executes revoke confirmation and attribute confirmation processes as an authentication process of a component which is to execute a data process of contents.

As seen in FIG. 3, a data processing section 271 of the drive 270 includes a recording medium control section 281 for performing driving of the information recording medium 272 and reading and writing of data from and on the information recording medium 272. The data processing section 271 further includes an input/output interface 282 for inputting and outputting data from and to a component which is to execute a processing of contents in the information processing apparatus, an authentication processing section 283 for executing an authentication process with the component, and a storage section 284.

The authentication processing section 283 includes a revoke confirmation section 291 for executing a revoke confirmation process based on a component revocation list as registration information of illegal component IDs, and an attribute confirmation section 292 for executing an attribute confirmation process of a component. The authentication processing section 283 further includes a cryptographic processing/arithmetic operation processing section 293 for executing a cryptographic process such as generation of a random number and generation of a key and an arithmetic operation process. The storage section 284 has stored therein a key vector (Av) which is a key unique to the drive and so forth.

A component revocation list (CRL) and a process permission component attribute decision list for being applied in the revoke confirmation and attribute confirmation processes in the authentication process of a component are stored in the information recording medium 272. Thus, in the revoke confirmation or attribute confirmation process, a list read from the information recording medium 272 is used.

It is to be noted that the component revocation list (CRL) and the process permission component attribute decision list read from the information recording medium 272 may otherwise be stored into and retained in the storage section 284 such that an authentication process may be executed based on the component revocation list (CRL) and the process permission component attribute decision list stored in the storage section 284. Or, the lists may be acquired otherwise from a server connected through a network. Such data storage configurations and acquisition configuration of the lists are hereinafter described.

The authentication processing section 283 executes an authentication process including revoke confirmation and attribute confirmation, for example, for the hardware component 210 for exclusive use or the software component 222.

The revoke confirmation section 291 of the authentication processing section 283 executes an authentication process with a component based on the component revocation list (CRL) as a list of illegal components recorded in the information recording medium 272 or the storage section 284. An example of the component revocation list (CRL) is shown in FIG. 4.

The component revocation list (CRL) is a list wherein component IDs set to components which have been determined illegal are set as seen in FIG. 4.

A component ID, is received by the drive from any component within a sequence of the authentication and attribute confirmation processes executed between the drive and the component. The revoke confirmation section 291 of the authentication processing section 283 of the drive decides whether or not the component ID received from the component is included in the IDs set in the component revocation list (CRL) and rejects the contents process if the component ID is included in the component revocation list (CRL).

On the other hand, if the component ID received from the component is not included in the component revocation list (CRL), then the attribute confirmation section 292 of the authentication processing section 283 decides, in the component attribute confirmation, whether or not the component has a component attribute for permission of the process. If it is confirmed that the component has a component attribute for permission of the process, then the contents process by the component is permitted.

It is to be noted that the component revocation list (CRL) is produced and successively updated by a management center by which utilization management of contents is performed.

The updated component revocation list (CRL) is recorded, for example, on the information recording medium on which the contents are recorded. Thus, when the information recording medium on which the updated component revocation list (CRL) is recorded is loaded into the information processing apparatus as a reproduction apparatus of the user, the information processing apparatus executes comparison in version of the list. If the version of the list recorded on the information recording medium is newer than the list stored in the storage section of the information processing apparatus, then the information processing apparatus executes a list updating process of replacing the component revocation list (CRL) stored in the storage section thereof with that of the new version.

It is to be noted that the updated component revocation list (CRL) may otherwise be provided to the information processing apparatus as a reproduction apparatus of the user through a network such as the Internet.

The attribute confirmation section 292 of the authentication processing section 283 executes, based on the process permission component attribute decision list as a list in which component attribute information for permitting a contents process stored in the information recording medium 272 or the storage section 284 is placed, a process of deciding whether or not the attributes of the component have an attribute or attributes for permission of the contents process. An example of the process permission component attribute information is illustrated in FIGS. 5A and 5B.

The process permission component attribute decision list may have various configurations. FIGS. 5A and 5B illustrate two examples of the process permission component attribute decision list.

FIG. 5A illustrates a process permission component attribute decision list wherein it is set that the contents process is permitted if the component is a hardware component but is rejected if the component is a software component.

The process permission component attribute decision list is set as a coordination list between component IDs coordinated with component attribute information to be determined or information representative of a range of IDs and process permission information.

A component ID is received by the drive from any component during a sequence of the authentication and attribute confirmation processes executed between the drive and the component. The attribute confirmation section 292 of the drive 270 decides whether or not the component ID received from the component is included in the IDs set to those components which have an attribute or attributes for permission of the process in the process permission component attribute decision list. If the component ID is included, then the attribute confirmation section 292 permits the contents process, but if the component ID is not included, then the attribute confirmation section 292 rejects the contents process.

FIG. 5A illustrates an example of the process permission component attribute decision list wherein the contents process is permitted only where the component is a hardware component but is rejected where the component is a software component.

The attribute confirmation section 292 of the authentication processing section 283 decides whether or not a component ID received from a component is included in IDs set to those components which have an attribute for permission of the process in the process permission component attribute decision list, that is, in the IDs xxxxx222xxx to xxxxx555xxx. If the component ID is included, then the attribute confirmation section 292 decides that the component is a hardware component and permits the contents process. However, if the component ID is not included, that is, if the component ID is one of xxxxx777xxx to xxxxx888xxx, then the attribute confirmation section 292 decides that the component is a software component and rejects the contents process. It is to be noted that [xxx] of the component IDs signifies any data.

It is to be noted that, while, in FIG. 5A, an example of the list is shown wherein two entries including an entry of a component attribute and a component ID for which the contents process is to be permitted and another entry of a component attribute and a component ID for which the contents process is to be rejected are set, only one of the entries may otherwise be set in a list.

FIG. 5B illustrates an example of the process permission component attribute decision list which allows not only decision of whether a component by which a contents process should be performed is a hardware component or a software component but also decision of a maker of, where the component is a hardware component, the hardware component so that a hardware component of a particular maker is determined as a component for permission of the contents process.

If the attribute confirmation section 292 of the drive 270 decides that the component ID received from a component is included in the IDs xxxxx222xxx to xxxxx555xxx, then it decides that the component is a hardware component of a maker A and hence decides that the component is a contents process permission component. Similarly, if the component ID received from a component is included in the IDs xxxxx556xxx to xxxxx666xxx, then the attribute confirmation section 292 decides that the component is a hardware component of another maker B and hence decides that the component is a contents process permission component.

On the other hand, if the component ID received from a component is included in the IDs xxxxx667xxx to xxxxx699xxx, then it decides that the component is a hardware component of a maker C and hence decides that the component is not a contents process permission component. Similarly, if the component ID received from a component is included in the IDs xxxxx777xxx to xxxxx888xxx, then the attribute confirmation section 292 decides that the component is a software component and hence decides that the component is not a contents process permission component.

The determination of a component attribute or attributes for decision of whether or not a component is a contents process permission component may be determination of whether the component is a hardware component or a software component as seen in FIG. 5A, or determination of whether the component is a hardware component or a software component and determination of a maker of a hardware component.

In addition to the determinations of a component attribute or attributes described, such various component attribute determinations as, for example, illustrated in FIG. 6 may be used for selection of a contents process permission component. It is to be noted that the component attribute determinations are made based on the component ID received from the component by the attribute confirmation section 292.

An example of component attributes applied in determination of a contents process permission component illustrated in FIG. 6 is described.

Component Category

It is decided that a category of a component is determined such as, for example, whether the component to be used for the contents process is a software program component, a video card component, an audio card component, a drive apparatus component or the like, and if the component belongs to a particular category, then it is decided as a contents process permission component.

The coordination between the categories and the component IDs is set, for example, as given below:

Software program=component ID: 11xxxxxxxxxx to 18xxxxxxxxxx

Video card=component ID: 21xxxxxxxxxx to 25xxxxxxxxxx

Audio card=component ID: 32xxxxxxxxxx to 37xxxxxxxxxx

Drive apparatus=component ID: 51xxxxxxxxxx to 62xxxxxxxxxx

The attribute confirmation section 292 of the drive decides a category based on a component ID received from a component and decides the component as a contents process permission component if the component belongs to a particular category.

Also other configurations are possible. For example, it is possible to set the component ID so as to include an ID unique to a maker, an ID acquired through a license agreement, or a like ID so that a component maker can be decided based on the component ID. Further, where one maker produces a plurality of models, it is possible to set the component ID so as to include a model identifier set to each component so that a component model can be decided based on the component ID. Furthermore, it is possible to set the component ID so as to include version information such as a version of a program or a version of firmware stored in hardware so that a component version can be decided based on the component ID.

Also it is possible to set the component ID so as to include identification information of the time of production of a component so that the time of production of the component may be decided based on the component ID. Further, it is possible to set the component ID such that it can be identified from the component ID whether the component is compatible with the version 1.00 (Ver. 1.00) of the Blu-ray Disk standards or with the version 2.00 (Ver. 2.00). Thus, the component ID can be set such that a component attribute in regard to whether the component is compatible with various standards can be decided based on the component ID.

In this manner, various attributes such as: whether the component is hardware or software; a component category; a component model; a component version; production time of the component; a component version of compatible standards, and so forth can be decided based on the component ID.

A process permission component attribute decision list according to attributes to be decided is stored in the storage section 284 of the drive. Thus, in an authentication and attribute confirmation process sequence between the drive and a component, the process permission component attribute decision list stored in the storage section 284 is referred to based on a component ID received from the component by the drive to decide whether or not the component has an attribute or attributes as a process permission component. Then, only when it is decided that the component has a process permission attribute or attributes, contents read out from the information recording medium are outputted to the component.

As described hereinabove, the drive apparatus executes a confirmation process of confirming whether or not the two conditions:

(a) that the component is not a revoke component to be excluded and (b) that the component attribute has a predetermined attribute are satisfied as described above based on the revocation list and the process permission component attribute decision list. Then, only when the two conditions (a) and (b) are satisfied, the component is permitted to execute the contents process, and data read out from the information recording medium is outputted to the component.

A detailed sequence of the component authentication process including the revoke confirmation and attribute confirmation processes executed between the drive and a component is described with reference to FIG. 7.

Figure 7:
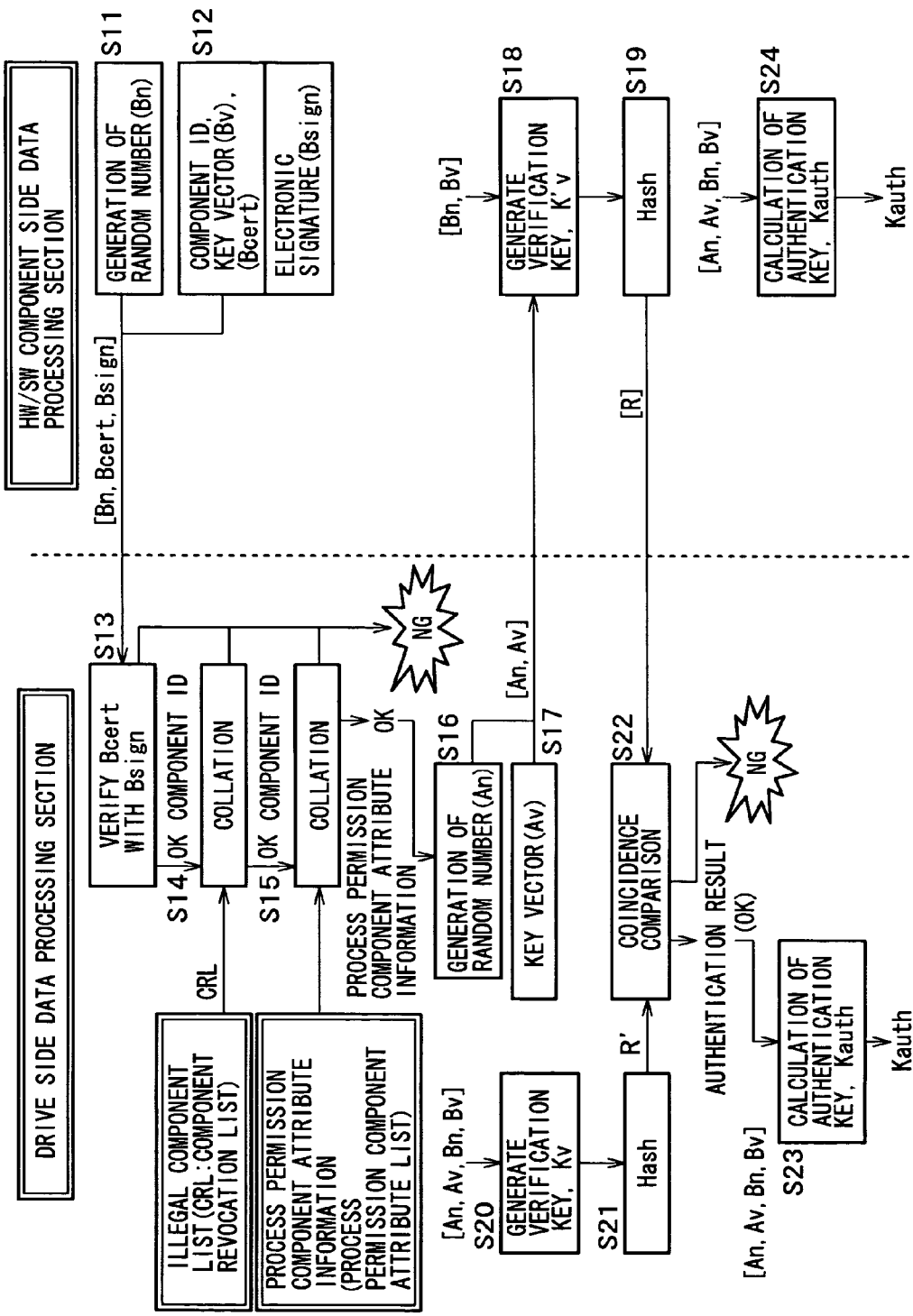
FIG. 7 is a flow diagram illustrating an authentication process sequence which is executed between the drive apparatus and a component and in which the component revocation list and the process permission component attribute decision list are applied.

In FIG. 7, the left side illustrates processes of the authentication processing section of the drive side while the right side illustrates processes of the data processing section which executes an authentication process of the component side which is to execute a contents process. The component in this instance may be any of several components such as a hardware (HW) component and a software (SW) component.

A program for executing the authentication process described below is stored in advance in the component, and the authentication sequence is executed under the control of the data processing section of the CPU or the like of the component side. Accordingly, any component which cannot execute the following authentication sequence is not acknowledged as the contents processing component.

The data processing section of the component side which tries to execute the contents process generates a random number (Bn) at step S1. Then at step S2, the data processing section sets an electronic signature (Bsign) for being applied in verification of presence/absence of falsification data or the validity to a certificate (Bcert) in which a component ID set as identification information of the component and a key vector (By) set as a unique key to the component and stored in the component are stored and sends the data [random number (Bn), certificate (Bcert) and electronic signature (Bsign)] to the drive side.

It is to be noted that the component ID placed in the certificate (Bcert) is set as ID information from which at least one of such various attributes of a component as described hereinabove with reference to FIGS. 5A, 5B and 6 can be determined.

The authentication processing section of the drive side executes, at step S13, a verification process based on the electronic signature (Bsign) set in the certificate (Bcert) received from the component and having the component ID and the key vector (By) are stored to confirm whether or not the certificate (Bcert) is subject to data falsification and the validity.

If it is not determined through the verification process based on the electronic signature (Bsign) that the certificate (Bcert) is valid, then the processing is ended without executing the succeeding processes and without outputting the contents to the component.

If it is determined through the verification process based on the electronic signature (Bsign) that the certificate (Bcert) is valid, then the processing advances to step S14, at which a collation process between the component ID stored in the certificate (Bcert) and the component revocation list (CRL) (refer to FIG. 4) recorded in the information recording medium loaded in the drive side or the storage section is executed to decide whether or not the component ID received from the component coincides with any of the IDs registered as illegal components in the component revocation list (refer to FIG. 4). If the component ID received from the component coincides with one of the component IDs registered in the component revocation list, then it is determined that the component of the authentication object is an illegal component, and the processing is ended without executing the succeeding processes and without outputting the contents to the component.

If the component ID received from the component is not any of the component IDs registered in the component revocation list, then it is determined that the authentication based on the revocation list is successful, and the processing advances to next step S15.

The authentication processing section 283 executes an attribute confirmation process of the component at step S15. In particular, the authentication processing section 283 executes a collation process between the component ID placed in the certificate (Bcert) and the process permission component attribute decision list (refer to FIGS. 5A and 5B) recorded in the information recording medium loaded in the drive side or the storage section to decide whether or not the component ID received from the component is registered as an ID having a process permission component attribute in the process permission component attribute decision list (refer to FIGS. 5A and 5B). In particular, the authentication processing section 283 collates the component ID received from the component with the process permission component attribute decision list (refer to FIGS. 5A and 5B) to decide whether or not the component attribute of the component of the authentication object is a process permission component attribute.

If it is determined based on the process permission component attribute decision list that the component with which the attribute confirmation process is being executed is a component which has a component attribute for which the contents process is to be rejected, then the processing is ended without executing the succeeding processes and without outputting the contents to the component.

If the authentication processing section 283 of the drive decides based on the process permission component attribute decision list that the component with which the attribute confirmation process is being executed has a component attribute for which the contents process is to be permitted, then the processing advances to next step S16.

At step S16, the drive generates a random number (An), and at step S16, the drive extracts the key vector (Av) which is a unique key to the drive side from the storage section 284 (refer to FIG. 3) and transmits the random number (An) and the key vector (Av) to the component.

The component executes, at step S18, a cryptographic process or an arithmetic operation process based on various data including the random number (Bn) generated at step S11 and the key vector (By) which is a unique key to the component as well as the random number (An) received from the drive and the key vector (Av) which is a unique key to the drive side to generate a verification key K'v. Further, at step S19, the component generates a hash value (R) of the verification key K'v. The hash value (R) is represented by R=Hash(K'v). The component transmits the hash value (R) of the verification key K'v thus generated to the drive.

At step S20, the drive executes a cryptographic process or an arithmetic operation process based on the random number (An) generated at step S16, the key vector (Av) which is a unique key to the drive side as well as the random number (Bn) received from the component and the key vector (By) which is a unique key to the component to generate a verification key Kv.

Further, at step S21, the drive generates a hash value (R') of the verification key Kv thus generated. The hash value (R') is represented by R'=Hash(Kv).

Then at step S22, the drive executes a comparison process between the hash value (R')=Hash(Kv) generated by the drive itself and the hash value (R)=Hash(K'v) received from the component.

If a result of the comparison exhibits coincidence, then the drive decides that the component authentication finally results in success. If the result of the comparison does not exhibit coincidence, then it is determined that the authentication results in failure, and the processing is ended without executing the succeeding processes and without outputting the contents to the component.

If the result of the comparison indicates coincidence, then the drive executes, at step S23, a cryptographic process or an arithmetic operation process based on the random number (An) generated at step S116 and the key vector (Av) which is a unique key to the drive side as well as the random number (Bn) received from the component and the key vector (Bv) which is a unique key to the component to generate an authentication key Kauth. Also the component side similarly executes, at step S24, a cryptographic process or an arithmetic operation process based on the random number (An) and the key vector (Av) which is a unique key to the drive side as well as the random number (Bn) generated by the component and the key vector (Bv) which is a unique key to the component to generate an authentication key Kauth.

The authentication sequence including the revocation situation confirmation and attribute confirmation processes of the component is ended through the processes described above. If the component authentication results in success in the authentication sequence, both of the drive and the component come to possess the common authentication key Kauth, and contents of the processing object, commands and so forth transferred between the two devices are transmitted and received in a form encrypted with the authentication key Kauth.

Figure 8:
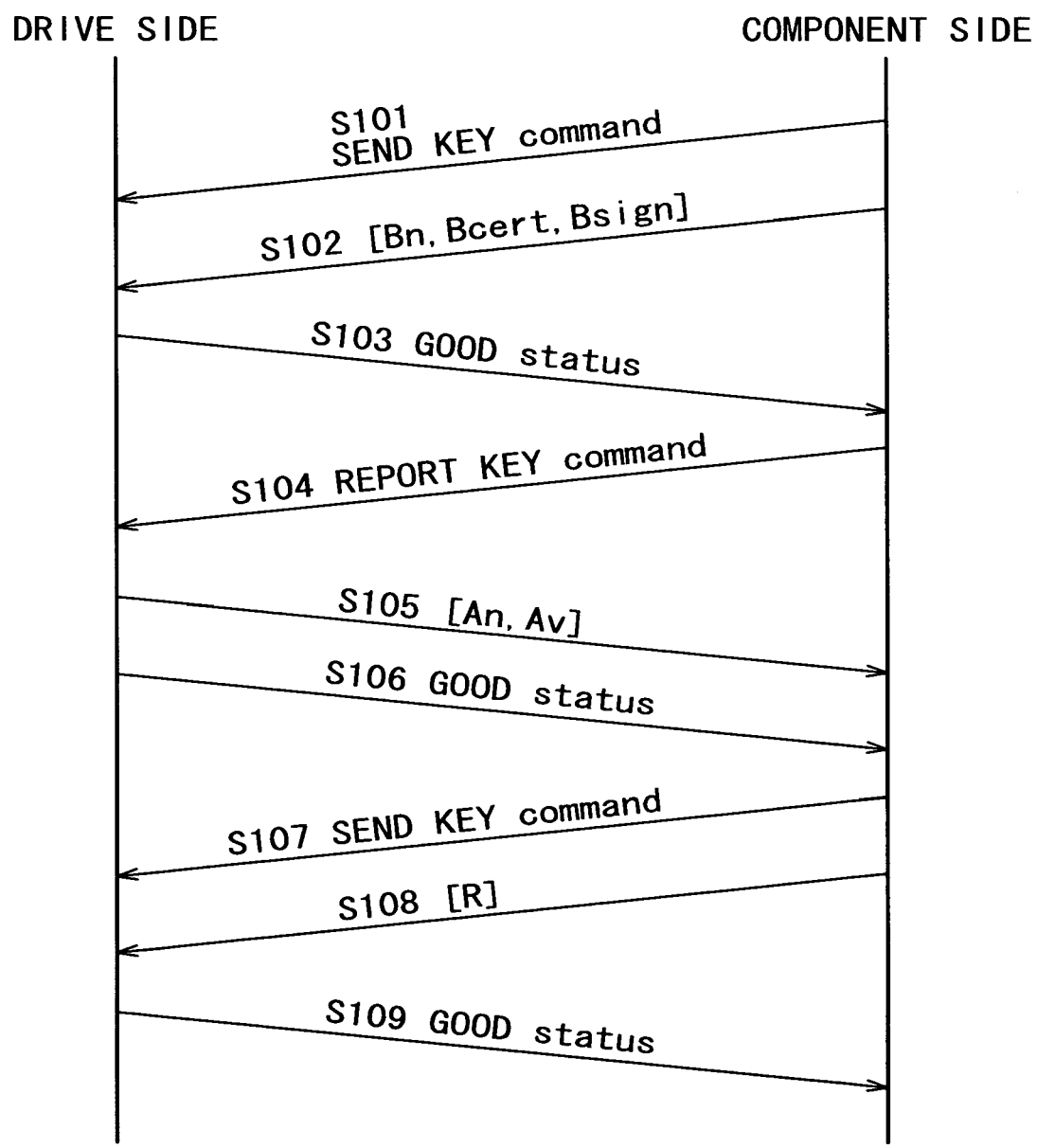
FIG. 8 is a diagram illustrating commands and data transmitted between the drive and a component in the authentication process sequence.

FIG. 8 illustrates data and commands transferred between the drive and the component through the authentication sequence between the two devices described above with reference to FIG. 7.

At steps S101 and S102, the component transmits a [random number (Bn), certificate (Bcert), electronic signature (Bsign)] to the drive together with a key requesting command (SEND KEY command).

The drive side receives the command and the data and verifies the validity of the certificate (Bcert) using the electronic signature (Bsign). If the validity of the certificate (Bcert) is verified, then the drive side acquires a component ID from the certificate (Bcert) and executes revoke confirmation based on the revocation list. Further, the drive decides based on the process permission component attribute decision list whether or not the authentication object component has a process permission component attribute.

If it is confirmed through the two confirmation processes of the revoke confirmation and the attribute confirmation that the component is a process permission component, then the drive issues, for example, a notification of a GOOD status as a response to the SEND_KEY command to the component at step S103, and then completes the command (OK).

However, if the validity of the certificate (Bcert) is not confirmed or if it is found based on the component ID that the component is revoked or otherwise if it is decided in the attribute confirmation that the component does not have a process permission attribute, then the drive completes the SEND_KEY command, for example, with a CHECK_CONDITION status not shown. In this instance, the succeeding processes are not executed and the contents are not outputted to the component.

If it is confirmed through the two confirmation processes of the revoke confirmation and the attribute confirmation that the component is a process permission component, then the drive side transfers the random number An and the key vector Av to the component side at step S105 under the condition that a report key command (REPORT KEY command) is received from the component side at step S104.

If the exchanging procedure described above completes successfully (for example, if the SEND_KEY command completes with the GOOD status), then the drive side transmits the GOOD status to the component as a response to the REPORT_KEY command at step S106 and then completes the command. However, if the exchanging procedure described above completes in failure, then the drive side completes the command with the CHECK_CONDITION status. In this instance, the succeeding processes are not executed and the contents are not outputted to the component.

If, for example, the REPORT_KEY command results in success in the process described above, the component side generates a verification key K'v from the random number (An) and the key vector (Av) received from the drive side and the random number (Bn) and the key vector (By) possessed by the component side and transfers a value R obtained through a Hash function determined in advance to the drive side using, for example, the SEND_KEY command at steps S107 and S108.

The drive side generates a verification key Kv from the random number (An), key vector (Av), random number (Bn) and key vector (By) possessed therein and obtains an output value R' through a Hash function determined in advance. Then, the drive compares the hash value R' calculated thereby and the hash value R received from the component side with each other to confirm coincidence between the values of them. If the two values coincide with each other, then the drive side completes the SEND_KEY command with the GOOD status and issues a notification of completion of the authentication to the component side at step S109. On the other hand, if the two values do not coincide with each other, then the drive side completes, for example, the SEND_KEY command with the CHECK_CONDITION status. In this instance, the succeeding processes are not executed and the contents are not outputted to the component. FIG. 8 illustrates the exchanging procedure of the commands between the drive side and the component side when the authentication process described above results in success.

If, for example, the SEND_KEY command is completed with the GOOD status in the process described above, then this signifies that it is confirmed that the component side and the drive side have the same random number (An), key vector (Av), random number (Bn) and key vector (Bv). Consequently, the component side and the drive side can individually calculate an authentication key Kauth in accordance with the method determined in advance.

Information to be presented from the component to the drive side in the authentication sequence described above is described below with reference to FIG. 9.

The component transmits a random number (Bn) 310 and data of a certificate 320 to which an electronic signature 330 is added to the drive.

The certificate 320 includes a component ID 350 as component identification information and a key vector (By) 360 as a unique key set to the component. The component ID 350 includes an attribute ID 351 from which a component attribute can be confirmed and an individual ID 352 as other individual confirmation of the component.

The drive confirms the validity of the certificate 320 based on the electronic signature 330, extracts the component ID 350 from the certificate 320 whose validity is confirmed, confirms a component attribute based on the attribute ID 351 which composes the component ID 350, and executes revoke confirmation based on the individual ID 352.

As a data configuration of the component ID 350, for example, such a configuration as to set high order bits of the component ID 350 as the attribute ID 351 and set low order bits as the individual ID 352 is possible.

The attribute ID 351 indicates an attribute of the component and is allocated one by one to the types of the hardware component, software component, drive and so forth. This ID is not necessarily be allocated one to one attribute permanently, but, for example, if it can be guaranteed that security similar to that of a hardware component can be assured for a software component, it is possible to separately allocate an attribute ID for a secure software component to the software component and operate the software component separately from an existing software component.

The individual ID 352 is a unique ID possessed by each of components which have a particular attribute ID and can be used to identify the components individually. A revoke verification process can be performed based only on the individual ID in a component ID.

The data configuration of the component ID 350 may otherwise be such that high order bits of the component ID 350 are set as the individual ID 352 and low order bits are set as the attribute ID 351 or the ID data is set such that fixed calculation is performed based on the attribute ID 351 to obtain the attribute ID and the individual ID. It is to be noted that, while, in the example shown in FIG. 9, the attribute ID 351 and the individual ID 352 are shown as separate IDs from each other, another ID setting may be used wherein part of the data of the individual ID 352 serves as the attribute ID 351.

Figure 10A:
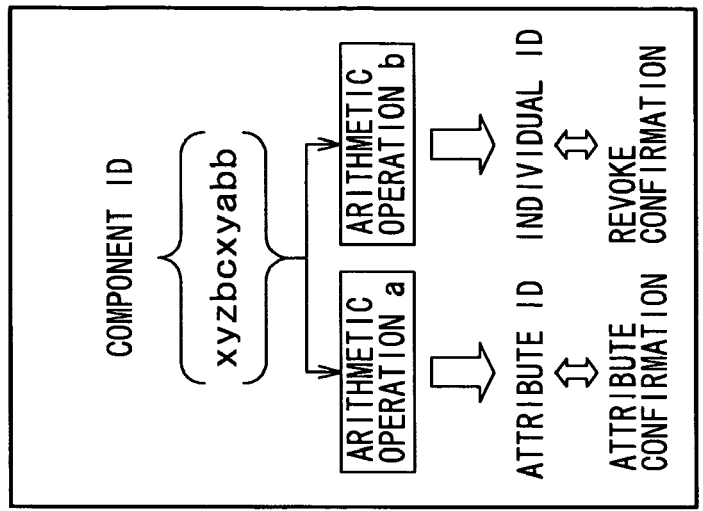
FIGS. 10A, 10B and 10C are views illustrating different examples of a configuration of a component ID.
Figure 10B:
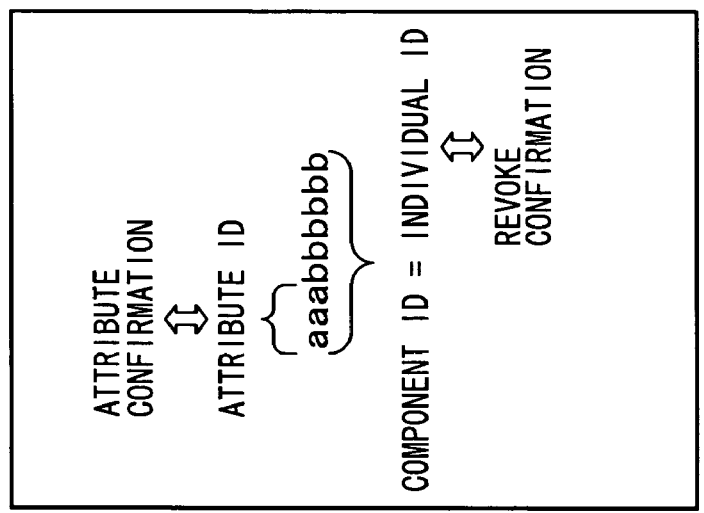
Figure 10C:
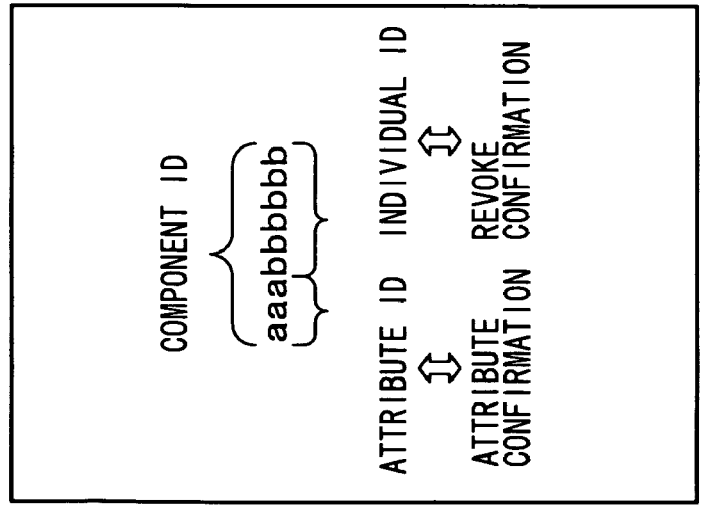

FIGS. 10A to 10C illustrate examples of setting of the component ID. FIG. 10A illustrates a configuration wherein high order bits and low order bits are set as the attribute ID and the individual ID and used for IDs for attribute confirmation and revoke confirmation, respectively. Also another setting is possible wherein high order bits and low order bits are set as the individual ID and the attribute ID, respectively or the nth to mth bits of the component ID are used as the attribute ID and the pth to qth bits are used as the individual ID.

FIG. 10B illustrates another example wherein the component ID is set as the component ID=individual ID and bit data of part of the component ID is applied as the attribute ID. The component ID described hereinabove with reference to FIGS. 5A, 5B and 6 corresponds to this ID setting example and is an example of an ID configuration wherein part of the data of the individual ID (component ID) serves as the attribute ID.

FIG. 10C illustrates an example wherein the attribute ID and the individual ID are data which are calculated by an arithmetic operation process based on the component ID.

In this manner, the data of the component ID can be set in various manners. Any data configuration may be used if a revoke decision and an attribute decision can be made based on composing data of the component ID.

While, in the examples described above, the component revocation list (CRL) and the process permission component attribute decision list are set as separate lists from each other, another configuration may otherwise be adopted wherein the component revocation list (CRL) and the process permission component attribute decision list are set as a single list such that the drive side executes an authentication process based on the single list.

Examples of setting of a list are described with reference to FIGS. 11A and 11B. FIG. 11A illustrates an example wherein the component revocation list (CRL) and the process permission component attribute decision list are formed as a single list, that is, as a process permission component decision list.

The process permission component decision list 401 shown in FIG. 11A has a list configuration wherein a component ID of totaling 32 bits including an attribute ID of 8 bits and an individual ID of 24 bits is stored and is an example of a list wherein an attribute ID and an individual ID for which the contents process is to be rejected are set as an entry. The attribute IDs and the individual IDs are represented as hexadecimal numbers (01h represents 01 of the hexadecimal notation).

Where attribute ID=01h and individual ID=012345h are set in the process permission component decision list 401 shown in FIG. 11A, the drive does not allow success in authentication of a component which presents the attribute ID=01h and the individual ID=012345h, that is, the drive does not permit the process of the contents.

Further, where attribute ID=02h and individual ID=ABCDEFh are set in the process permission component decision list 401 shown in FIG. 11A, the drive does not allow success in authentication of a component which presents the attribute ID=02h and the individual ID=ABCDEFh, that is, the drive does not permit the process of the contents.

Furthermore, where attribute ID=01h and individual ID=FFFFFFh are set in the process permission component decision list 401 shown in FIG. 11A, the drive does not allow success in authentication of a component which presents a component ID including the attribute ID=01h irrespective of the value of the individual, that is, the drive does not permit the process of the contents.

FIG. 11B illustrates another example wherein a component revocation list (CRL) and a process permission component attribute decision list are set as separate lists from each other.

Where attribute ID=01h and individual ID=012345h are set in a component revocation list (CRL) 402, the drive does not allow success in authentication of a component which presents a component ID including the attribute ID=01h and the individual ID=012345h, that is, the drive does not permit the process of the contents.

Where attribute ID=02h and individual ID=ABCDEFh are set in the component revocation list (CRL) 402, the drive does not allow success in authentication of a component which presents the attribute ID=02h and the individual ID=ABCDEFh, that is, the drive does not permit the process of the contents.

If the component revocation list (CRL) 402 does not include an individual ID which coincides with an individual ID included in the component ID presented by the component, then the component attribute is subsequently decided based on the process permission component attribute decision list.

(B-1) of FIG. 11B illustrates a process permission component attribute decision list 403 which is an example of a list wherein entry data includes an attribute ID corresponding to an attribute for which the contents process is to be permitted.

Where attribute ID=01h is set in the process permission component attribute decision list 403, the drive allows establishment in authentication of a component which presents a component ID including the attribute ID=01h, that is, the drive permits the process of the contents.

(B-2) of FIG. 11B illustrates a process permission component attribute decision list 404 which is an example of a list wherein entry data includes an attribute ID corresponding to an attribute for which the contents process is to be rejected.

Where attribute ID=02h is set in the process permission component attribute decision list 404, the drive does not allow success in authentication of a component which presents a component ID which includes the attribute ID=02h, that is, the drive does not permit the process of the contents.

In this manner, various forms are possible as the data configurations of the component revocation list (CRL) and the process permission component attribute decision list applied in the drive.

In any case, where a component ID presented from a component is registered as an illegal component in the component revocation list (CRL) or it is decided that the component ID has an attribute for which the process cannot be permitted based on the process permission component attribute decision list, outputting of the contents to the component is not executed.

It is to be noted that, where a list is set such that establishment of authentication of a component which has any of attribute IDs listed in the list like the process permission component attribute decision list 403 illustrated in (B-1) of FIG. 11B is to be permitted, if a component having a new attribute ID which is not registered in the list appears, then establishment of authentication of the component is rejected. On the other hand, where a list is set such that establishment of authentication of a component which has any of attribute IDs listed in the list like the process permission component attribute decision list 404 illustrated in (B-2) of FIG. 11B is to be rejected, if a component having a new attribute ID which is not registered in the list appears, then establishment of authentication of the component is permitted. In this instance, it is possible to allocate a new attribute ID to a component having a higher degree of security to allow reproduction of contents on a recording medium which always is under the distribution.

It is to be noted that the component revocation list (CRL) and the process permission component attribute decision list need not necessarily have a data entry set therein but one or both of them may possibly be free from a data entry.

Now, a particular example in a case wherein authentication of a component results in success and another particular example in another case wherein authentication of a component results in failure are described with reference to FIGS. 12A and 12B.

FIG. 12A illustrates an example of a process wherein only a component revocation list (CRL) 511 is used to execute collation based on a component ID to execute a decision of whether authentication results in success or failure. Meanwhile, FIG. 12B illustrates an example of another process wherein two lists including a component revocation list (CRL) 521 and a process permission component attribute decision list 522 are used to execute collation based on a component ID to execute a decision of whether authentication results in success or failure.

In the examples of FIGS. 12A and 12B, the attribute to be determined as a component attribute is an attribute of whether the component is a hardware component or a software component and the component ID to be set to each component is formed from totaling 32 bits including an attribute ID of 8 bits and an individual ID of 24 bits. Further, the value of each attribute ID is set in a coordinated relationship with a component attribute such that attribute ID=01h→software component
attribute ID=02h→hardware component In the example of FIG. 12A, it is assumed that the component revocation list (CRL) 511 includes two entries set therein and having, as component IDs of revoke components, attribute ID=01h, individual ID=000002h
attribute ID=02h, individual ID=000002h It is further assumed that each of software components or hardware components individually having component IDs illustrated in (a) to (d) of FIG. 12A executes, as a contents process planning component, authentication with the drive, which has the component revocation list (CRL) 511 of the setting described above stored in the storage section thereof, and presents the component ID thereof to the drive. The drive collates the component ID presented from the component with the entry IDs of the component revocation list (CRL). The drive thus executes a process that, if the collation reveals coincidence, then the drive determines that the component is an object of revoke (exclusion) and determines that the authentication results in failure, but if the collation reveals incoincidence, then the drive decides that the component is not an object of revoke (exclusion) and determines that the authentication results in success. Results of the determination process of the components are shown on the right side in FIG. 12A.

In particular, in the case of (a) of FIG. 12A, that is, where the authentication processing object is a software component and the component ID is attribute ID=01h, individual ID=000001h, since this component ID [01h, 000001h] does not coincide with any of the entry IDs

[01h, 000002h] and

[02h, 000002h]

of the component revocation list (CRL) 511, it is decided that the software component which presents the component ID [01h, 000001h] is not an object of revoke (elimination), and the authentication results in success.

Where the authentication processing object is a hardware component and the component ID is attribute ID=02h, individual ID=000001h, since this component ID [02h, 000001h] does not coincide with any of the entry IDs

[01h, 000002h] and

[02h, 000002h]

of the component revocation list (CRL) 511, it is decided that the hardware component which presents the component ID [02h, 000001h] is not an object of revoke (elimination), and the authentication results in success.

In the case of (b) of FIG. 12A, where the authentication processing object is a software component and the component ID is attribute ID=01h, individual ID=000001h, since this component ID [01h, 000001h] does not coincide with any of the entry IDs

[01h, 000002h] and

[02h, 000002h]

of the component revocation list (CRL) 511, it is decided that the software component which presents the component ID [01h, 000001h] is not an object of revoke (elimination), and the authentication results in success.

Where the authentication processing object is a hardware component and the component ID is attribute ID=02h, individual ID=000002h, since this component ID [02h, 000002h] coincides with one of the entry IDs

[01h, 000002h] and

[02h, 000002h]

of the component revocation list (CRL) 511, it is decided that the hardware component which presents the component ID [02h, 000002h] is an object of revoke (elimination), and the authentication results in failure.

In the case of (c) of FIG. 12A, where the authentication processing object is a software component and the component ID is attribute ID=01h, individual ID=000002h, since this component ID [01h, 000002h] coincide with one of the entry IDs

[01h, 000002h] and

[02h, 000002h]

of the component revocation list (CRL) 511, it is decided that the software component which presents the component ID [01h, 000002h] is an object of revoke (elimination), and the authentication results in failure.

Where the authentication processing object is a hardware component and the component ID is attribute ID=02h, individual ID=000001h, since this component ID [02h, 000001h] does not coincide with any of the entry IDs

[01h, 000002h] and

[02h, 000002h]

of the component revocation list (CRL) 511, it is decided that the hardware component which presents the component ID [02h, 000001h] is not an object of revoke (elimination), and the authentication results in success.

In the case of (d) of FIG. 12A, where the authentication processing object is a software component and the component ID is attribute ID=01h, individual ID=000002h, since this component ID [01h, 000002h] coincides with one of the entry IDs

[01h, 000002h] and

[02h, 000002h]

of the component revocation list (CRL) 511, it is decided that the software component which presents the component ID [01h, 000002h] is an object of revoke (elimination), and the authentication results in failure.

Where the authentication processing object is a hardware component and the component ID is attribute ID=02h, individual ID=000002h, since this component ID [02h, 000002h] coincides with one of the entry IDs

[01h, 000002h] and

[02h, 000002h]

of the component revocation list (CRL) 511, it is decided that the hardware component which presents the component ID [02h, 000002h] is an object of revoke (elimination), and the authentication results in failure.

FIG. 12B illustrates an example of a process wherein the two lists of the component revocation list (CRL) 521 and the process permission component attribute decision list 522 are used to execute collation based on a component ID to execute a decision of whether authentication results in success or failure.

In the example of FIG. 12B, it is assumed that the component revocation list (CRL) 521 includes two entries set therein and having, as component IDs of revoke (elimination) components, attribute ID=01h, individual ID=000002h attribute ID=02h, individual ID=000002h It is further assumed that one entry having, as an attribute ID corresponding to a component attribute for which the process is to be rejected, attribute ID=01h is set in the process permission component attribute decision list 522.

The process permission component attribute decision list 522 has a setting that, where the component has an attribute ID=01h, that is, where the component is a software component, the process is to be rejected.

It is assumed that each of software components or hardware components individually having component IDs illustrated in (a) to (d) of FIG. 12B executes, as a contents process planning component, authentication with the drive, which has the component revocation list (CRL) 521 and the process permission component attribute decision list 522 of the settings described above stored in the storage section thereof, and presents the component ID thereof to the drive. The drive collates the component ID presented from the component with the entry IDs of the component revocation list (CRL). If the collation reveals coincidence, then the drive determines that the component is an object of revoke (exclusion) and determines that the authentication results in failure. However, if the collation reveals incoincidence, then the drive decides that the component is not an object of revoke (exclusion) based on the component revocation list (CRL) 521 and then executes a collation process with the process permission component attribute decision list 522. If it is determined that the component ID presented from the component does not have a process permission attribute based on the process permission component attribute decision list 522, then the drive determines that the authentication results in failure. However, if it is determined that the component ID presented from the component has a process permission attribute, then the drive executes a process of determining that the authentication results in success. Results of the determination process are shown on the right side in FIG. 12B.

In particular, in the case of (a) of FIG. 12B, that is, where the authentication processing object is a software component and the component ID is attribute ID=01h, individual ID=000001h, since this component ID [01h, 000001h] does not coincide with any of the entry IDs

[01h, 000002h] and

[02h, 000002h]

of the component revocation list (CRL) 521, it is decided that the software component which presents the component ID [01h, 000001h] is not an object of revoke (elimination), and the drive executes another collation process with the process permission component attribute decision list 522.

The attribute ID (01h) in the component ID [01h, 000001h] coincides with the entry [01h] set as an attribute ID for which the process should be rejected in the process permission component attribute decision list 522. As a result, it is determined that the software component which presents the component ID [01h, 000001h] has an attribute for which the process cannot be permitted, and the authentication results in failure.

Where the authentication processing object is a hardware component and the component ID is attribute ID=02h, individual ID=000001h, since this component ID [02h, 000001h] does not coincide with any of the entry IDs

[01h, 000002h] and

[02h, 000002h]

of the component revocation list (CRL) 521, it is decided that the hardware component which presents the component ID [02h, 000001h] is not an object of revoke (elimination), and the drive executes another collation process with the process permission component attribute decision list 522.

The attribute ID (02h) in the component ID [02h, 000001h] does not coincide with the entry [01h] set as an attribute ID for which the process should be rejected in the process permission component attribute decision list 522. As a result, it is determined that the hardware component which presents the component ID [02h, 000001h] has an attribute for which the process can be permitted, and the authentication results in success.

In the case of (b) of FIG. 12B, where the authentication processing object is a software component and the component ID is attribute ID=01h, individual ID=000001h, since this component ID [01h, 000001h] does not coincide with any of the entry IDs

[01h, 000002h] and

[02h, 000002h]

of the component revocation list (CRL) 521, it is decided that the software component which presents the component ID [01h, 000001h] is not an object of revoke (elimination), and the drive executes another collation process with the process permission component attribute decision list 522.

The attribute ID (01h) in the component ID [01h, 000001h] coincides with the entry [01h] set as an attribute ID for which the process should be rejected in the process permission component attribute decision list 522. As a result, it is determined that the software component which presents the component ID [01h, 000001h] has an attribute for which the process cannot be permitted, and the authentication results in failure.

Where the authentication processing object is a hardware component and the component ID is attribute ID=02h, individual ID=000002h, since this component ID [02h, 000002h] coincides with one of the entry IDs

[01h, 000002h] and

[02h, 000002h]

of the component revocation list (CRL) 521, it is decided that the hardware component which presents the component ID [02h, 000002h] is an object of revoke (elimination), and the authentication results in failure.

In the case of (c) of FIG. 12B, where the authentication processing object is a software component and the component ID is attribute ID=01h, individual ID=000002h, since this component ID [01h, 000002h] coincides with one of the entry IDs

[01h, 000002h] and

[02h, 000002h]

of the component revocation list (CRL) 521, it is decided that the software component which presents the component ID [01h, 000002h] is an object of revoke (elimination), and the authentication results in failure.

Where the authentication processing object is a hardware component and the component ID is attribute ID=02h, individual ID=000001h, since this component ID [02h, 000001h] does not coincide with any of the entry IDs

[01h, 000002h] and

[02h, 000002h]

of the component revocation list (CRL) 521, it is decided that the hardware component which presents the component ID [02h, 000001h] is not an object of revoke (elimination), and the drive executes another collation process with the process permission component attribute decision list 522.

The attribute ID (02h) in the component ID [02h, 000001h] does not coincide with the entry [01h] set as an attribute ID for which the process should be rejected in the process permission component attribute decision list 522. As a result, it is determined that the hardware component which presents the component ID [02h, 000001h] has an attribute for which the process can be permitted, and the authentication results in success.

In the case of (d) of FIG. 12B, where the authentication processing object is a software component and the component ID is attribute ID=01h, individual ID=000002h, since this component ID [01h, 000002h] coincides with one of the entry IDs

[01h, 000002h] and

[02h, 000002h]

of the component revocation list (CRL) 521, it is decided that the software component which presents the component ID [01h, 000002h] is an object of revoke (elimination), and the authentication results in failure.

Where the authentication processing object is a hardware component and the component ID is attribute ID=02h, individual ID=000002h, since this component ID [02h, 000002h] coincides with one of the entry IDs

[01h, 000002h] and

[02h, 000002h]

of the component revocation list (CRL) 521, it is decided that the hardware component which presents the component ID [02h, 000002h] is an object of revoke (elimination), and the authentication results in failure.

As can be recognized from the comparison between the results of the authentication of FIGS. 12A and 12B, even if authentication results in success in the authentication process of FIG. 12A wherein only the component revocation list (CRL) is used, authentication sometimes results in failure in the authentication process of FIG. 12B wherein both of the component revocation list (CRL) and the process permission component attribute decision list are used. This is because the authentication process of FIG. 12B can determine based on the process permission component attribute decision list that the authentication of all components having the attribute of a software component results in failure and thus exclude them.

In this manner, according to the configuration of the present invention, attribute confirmation of a component can be executed based on the process permission component attribute decision list and it can be decided that the authentication results in success only if it is confirmed that the component has a predetermined attribute. Consequently, such a process as to eliminate, for example, all software components from contents process components.

As described hereinabove, for example, if a software program causes an encrypted contents process to be executed on a PC, then a decryption process is executed as a process of the CPU which executes processing under the control of a general purpose OS, and there is the possibility that intermediate data which appears during the process or result data may be stored into a general purpose memory of the PC. The possibility that such data may be exploited cannot be denied.

Accordingly, it is an effective countermeasure for prevention of leakage or duplication of contents or a cryptographic key to execute a contents process within a closed hardware component which does not utilize a memory.

According to the configuration of the present invention, it is possible to permit a contents process only for a component which is confirmed to have a predetermined attribute through the attribute confirmation of the component based on the process permission component attribute decision list described above. Consequently, leakage and duplication of contents or a cryptographic key can be prevented effectively.

A drive which executes an authentication process of a component stores the component revocation list (CRL) and the process permission component attribute decision list described above into a storage section thereof and executes revoke confirmation and attribute confirmation applying the lists.

Figure 13:
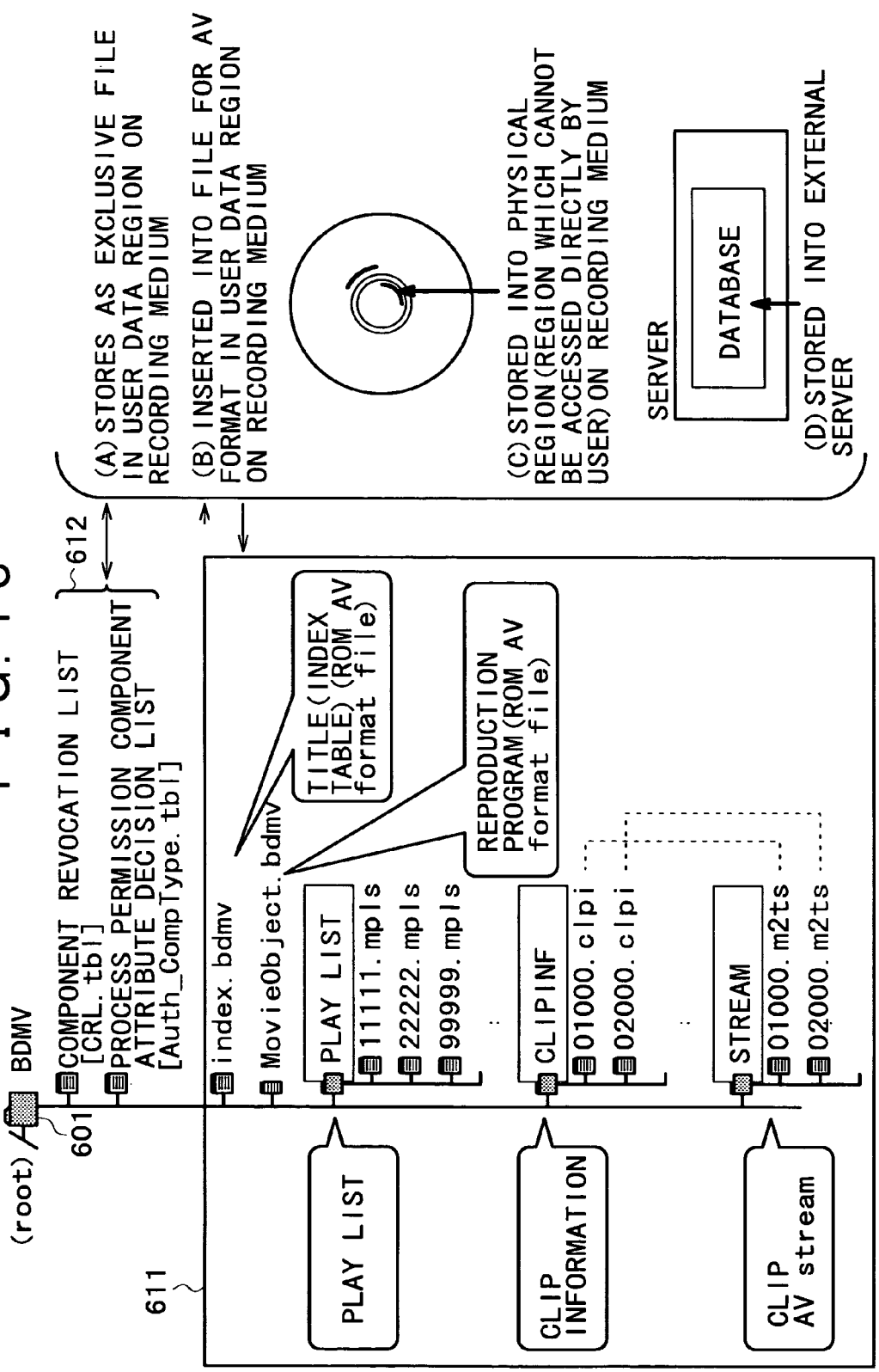
FIG. 13 is a view illustrating a different example of data storage of the component revocation list and the process permission component attribute decision list.

An example of data storage of the component revocation list (CRL) and the process permission component attribute decision list is described below with reference to FIG. 13. FIG. 13 illustrates a BDMV directory 601 for storing application files in a Blu-ray Disk (blue laser disk) ROM format. The BDMV directory 601 is set as a management directory of contents recorded on an information recording medium.

Referring to FIG. 13, a contents data part 611 of the BDMV directory 601 includes contents data files having a hierarchical configuration, that is, data files of a title, an application index, a reproduction program, a play list, a clip and so forth.

The data files are stored in a user data region of the information recording medium. It is to be noted that an AV stream which is contents entity data is stored as an encrypted data file in the clip.

Such forms as seen, for example, in (A) to (D) of FIG. 13 are available as an example of setting of data of the component revocation list (CRL) and the process permission component attribute decision list.

(A) of FIG. 13 illustrates an example wherein the component revocation list (CRL) and the process permission component attribute decision list are stored in a user data region of a management data part 612 of the BDMV directory 601.

(B) of FIG. 13 illustrates another example wherein the component revocation list (CRL) and the process permission component attribute decision list are inserted in a file for an AV format in the contents data part 611 included in the user data region on the information recording medium. For example, management table data is inserted into a file for an AV format such as, for example, the title, the index data file or the play list to store the component revocation list (CRL) and the process permission component attribute decision list.

(C) of FIG. 13 illustrates a further example wherein the component revocation list (CRL) and the process permission component attribute decision list are stored in a physical region of the information recording medium, that is, a region which cannot be accessed directly by the user such as the lead-in region set on the information recording medium.

(D) of FIG. 13 is a still further example wherein the component revocation list (CRL) and the process permission component attribute decision list are stored in an external server. Thus, an information processing apparatus which is used to reproduce contents from an information recording medium on which the contents are recorded acquires the component revocation list (CRL) and the process permission component attribute decision list from the external server and executes a component authentication process based on the thus acquired list.

The component revocation list (CRL) and the process permission component attribute decision list are stored, for example, in one of the forms of (A) to (D) of FIG. 13.

It is to be noted that the component revocation list (CRL) and the process permission component attribute decision list are used for a collation process with a component ID of a component by a drive, and where there is the necessity to allow the component revocation list (CRL) and the process permission component attribute decision list to be accessed only by the drive, preferably the method of (C) of FIG. 13 is applied. Further, where there is the necessity to update the component revocation list (CRL) and the process permission component attribute decision list as occasion demands, it is effective to use the method of (D) of FIG. 13, that is, to store the component revocation list (CRL) and the process permission component attribute decision list in a server such that an information processing apparatus can acquire the lists updated as occasion demands.

Now, a sequence wherein a drive outputs contents read from an information recording medium to a component whose authentication results in success as a result of an authentication process between the drive and the component so that reproduction of the contents is executed is described with reference to FIG. 14.

First, the drive and the component come to share an authentication key Kauth as a result of the authentication process between the drive and the component as described hereinabove with reference to FIG. 7.

Figure 14:
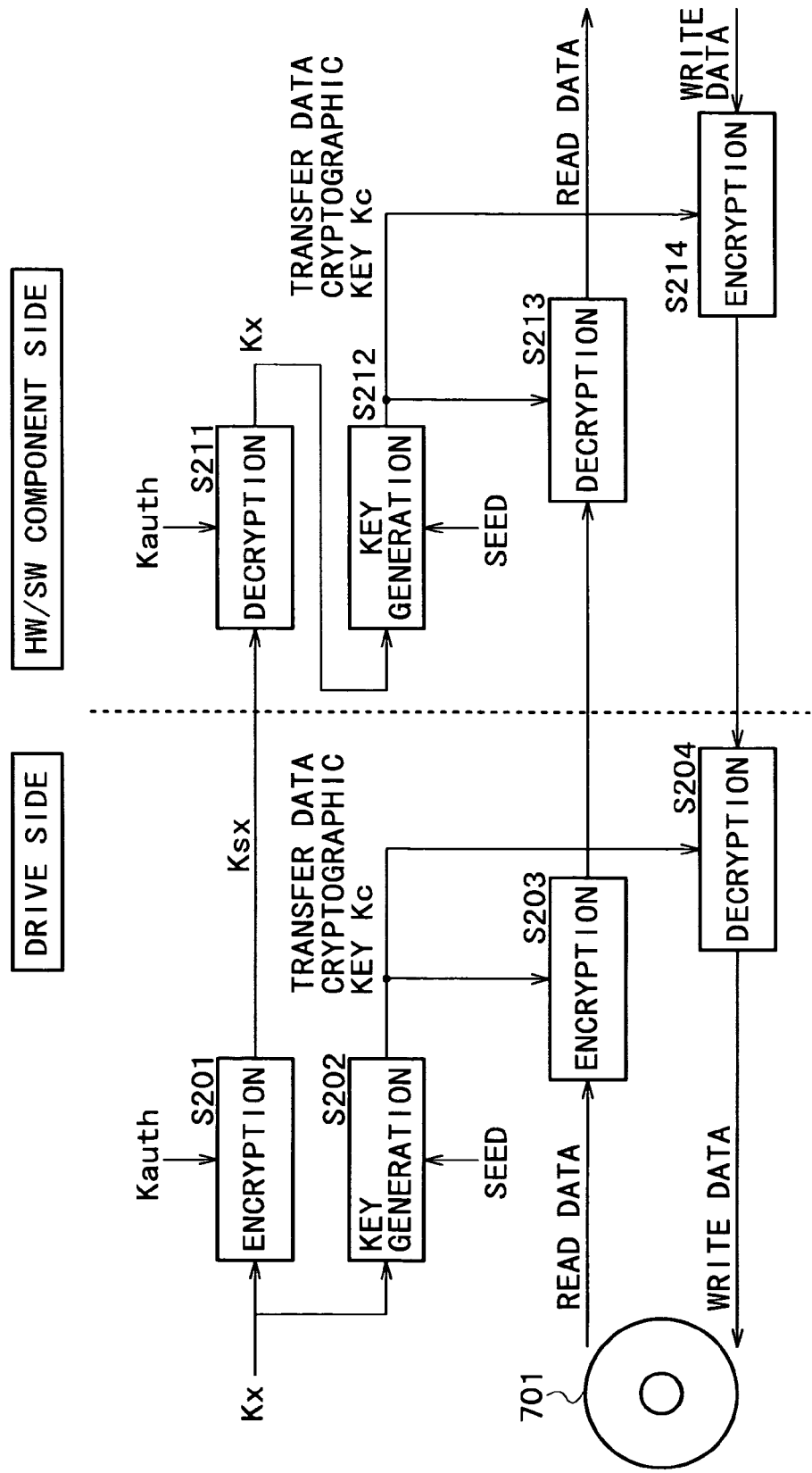
FIG. 14 is a block diagram illustrating a data reading and transfer process from an information recording medium and a transfer process sequence of write data after authentication between the drive and a component results in success.

FIG. 14 illustrates processes of the drive and the component which share the authentication key Kauth. After the authentication key Kauth is shared, a key Kx necessary to generate a transfer data cryptographic key Kc is transferred from the drive side to the component side. At step S201, the key Kx is encrypted with the authentication key Kauth by the drive side and transferred as an encrypted key Ksx=Enc (Kauth, Kx) to the component side. Enc(A,B) represents encrypted data of data B with a key A applied.

At step S211, the component side executes a decryption process using the authentication key Kauth for the received data Ksx=Enc(Kauth, Kx) to acquire the key Kx.

The key Kx transferred from the drive side to the component side has a fixed value stored in the drive, a value generated using a random number by the drive side and different every time or a value obtained by utilizing data at a particular place recorded on the information recording medium 701.

After the drive side and the component side come to have the same key Kx, both of them utilize a SEED value determined in advance and a value calculated from the key Kx and the authentication key Kauth to generate a transfer data cryptographic key Kc at steps S202 and S212, respectively. The transfer data cryptographic key Kc is utilized to encrypt data to be transferred between the drive side and the component side.

For example, data including contents read out from the information recording medium 701 by the drive is encrypted with the transfer data cryptographic key Kc applied by the drive side and is transmitted to the component at step S203. The component side applies the transfer data cryptographic key Kc to perform a decryption process for the received data to reproduce the data at step S213. It is to be noted that the contents decrypted applying the transfer data cryptographic key Kc are encrypted contents recorded on the information recording medium 701, and the component further executes a decryption process for the encrypted contents and reproduces and outputs the decrypted contents.

Meanwhile, write data on the information recording medium 701 to be transmitted from the component to the drive is encrypted applying the transfer data cryptographic key Kc by the component side and then transmitted to the drive at step S214. The drive side applies the transfer data cryptographic key Kc to decrypt the write data and records the decrypted data on the information recording medium at step S204. It is to be noted that, as occasion demands, the drive executes a contents encryption process applying a cryptographic key not shown before the recording on the information recording medium 701 and records the resulting encrypted contents on the information recording medium 701.

FIGS. 15A and 15B illustrate an exchanging procedure of commands between the component side and the drive side in a data reading out process from an information recording medium and another exchanging procedure of commands between the component side and the drive side in a data writing process on an information recording medium, respectively.

Referring to FIG. 15A, the component side issues a request for a key Kx using a REPORT_KEY command to the drive side at step S301. In response to the request, the drive side encrypts the key Kx with the authentication key Kauth to obtain an encrypted key Ksx and returns the encrypted key Ksx using a GOOD status to the component side at step S302.

The component side receives the encrypted key Ksx and issues a READ command to the drive side at step S303. The drive side receives the READ command and transfers encrypted contents information at step S304. The drive side transmits a GOOD status indicative of an end of the command process to the component at step S305 and ends the processing.

An exchanging procedure of commands between the component (PC) side and the drive side in a writing process are illustrated in FIG. 15B. Referring to FIG. 15B, at step S401, the component side issues a request for a key Kx using a REPORT_KEY command to the drive side. In response to the request, the drive side encrypts the key Kx with the authentication key Kauth to obtain an encrypted key Ksx and returns the encrypted key Ksx to the component side using a GOOD status at step S402.

The component side receives the encrypted key Ksx and outputs a WRITE command (data writing requesting command) to the drive side and then transfers encrypted contents information at step S403.

After the transfer of the encrypted contents information is completed, the drive side transmits a GOOD status indicative of an end of the command process to the component at step S404, and ends the processing.

It is to be noted that the series of processes described hereinabove can be executed by hardware, by software or by a composite configuration of hardware and software. Where the series of processes is executed by software, a program which defines a processing sequence is installed into a memory in a computer incorporated in hardware for exclusive use so as to be executed or into a computer for universal use which can execute various processes so as to be executed.

For example, the program can be recorded in advance on a hard disk or a ROM (Read Only Memory) as a recording medium. Or, the program may be stored (recorded) temporarily or permanently on a removable recording medium such as a flexible disk, a CD-ROM (Compact Disc Read Only Memory), an MO (Magneto-Optical) disk, a DVD (Digital Versatile Disc), a magnetic disk or a semiconductor memory. Such a removable recording medium as just mentioned can be provided as package software.

It is to be noted that the program may not be installed from such a removable recording medium as described above into a computer but may otherwise be transferred from a download site to a computer by radio communication or through a network such as a LAN (Local Area Network) or the Internet to a computer by wire communication. The computer may receive the program transferred in this manner and install the program into a built-in recording medium thereof such as a hard disk.

It is to be noted that the steps described in the present specification may be but need not necessarily be processed in a time series in the order as described or may be executed parallelly or individually based on the processing capacity of the apparatus which executes the processing or as occasion demands. Further, in the present specification, the term "system" is used to represent a logical collective configuration composed of a plurality of apparatus which may be or may not be included in the same housing.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing apparatus comprising:
a drive;
a data outputting section;

at least one processor;

at least one memory device which stores instructions, which when executed by the at least one processor, cause the at least one processor to operate with the drive and the data outputting section to:
- (a) upon an information recording medium being loaded in the drive, read data recorded on said information recording medium, wherein a process permission component attribute decision list that includes a plurality of component attributes is stored on said information recording medium;
- (b) receive a component ID from a component, said component being independent from the information recording medium;
- (c) determine whether a first component attribute of the component comprising information of whether the component is a hardware component or a software component is registered as one of the plurality of component attributes included in the attribute decision list stored on the information recording medium, wherein if the first component attribute of the component is registered as one of the plurality of component attributes, output the read data recorded on said information recording medium to the component;
- (d) determine whether a second component attribute of the component comprising information of a component maker is registered as one of the plurality of component attributes included in the attribute decision list stored on the information recording medium, wherein if the second component attribute is registered as one of the plurality of component attributes, output the read data recorded on said information recording medium to the component;
- (e) determine whether a third component attribute of the component comprising information of a component model is registered as one of the plurality of component attributes included in the attribute decision list stored on the information recording medium, wherein if the third component attribute is registered as one of the plurality of component attributes, output the read data recorded on said information recording medium to the component; and
- (f) determine whether a fourth component attribute of the component comprising information of a component version is registered as one of the plurality of component attributes included in the attribute decision list stored on the information recording medium, wherein if the fourth component attribute is registered as one of the plurality of component attributes, output the read data recorded on said information recording medium to the component.

2. The information processing apparatus of claim 1, wherein when executed by the at least one processor, the instructions cause the at least one processor to:
- (a) collate the component ID received from the component and IDs registered in the process permission component attribute decision list; and
- (b) confirm, based on a result of the collation, whether any of said attributes of the component are registered in the process permission component attribution decision list, wherein if any of the attributes of the component are registered in said process permission component attribute list, output the read data recorded on said information recording medium to the component.

3. The information processing apparatus of claim 1, wherein when executed by the at least one processor, the instructions cause the at least one processor to:
- (a) receive a certificate, which has the component ID stored therein and has an electronic signature added thereto, from the component;
- (b) execute a validity confirmation process of the certificate based on the electronic signature; and
- (c) execute an attribute confirmation process of the component based on the component ID acquired from the certificate whose validity is confirmed.

4. The information processing apparatus of claim 1, wherein when executed by the at least one processor, the instructions cause the at least one processor to determine whether a fifth component attribute of the component is registered as one of the plurality of component attributes included in the attribute decision list stored on the information recording medium, wherein said fifth component comprises one of:
- (a) information of whether only a hardware component is set as the data process permission component attribute;
- (b) information of whether only a software component is set as the data process permission component attribute; and
- (c) information whether both of a hardware component and a software component are set as the data process permission component attributes.

5. The information processing apparatus of claim 1, wherein when executed by the at least one processor, the instructions cause the at least one processor to:
- (a) determine whether a fifth component attribute of the component comprising information of whether the component is a hardware component for exclusive use which belongs to a particular category; and
- (b) execute a successful authentication process if the component is the hardware component for exclusive use.

6. The information processing apparatus of claim 1, wherein when executed by the at least one processor, the instructions cause the at least one processor to:
- (a) collate the component ID received from the component and a component revocation list as a list of illegal components; and
- (b) execute a revoke confirmation process of confirming whether or not the component is a revoked illegal component.

7. The information processing apparatus of claim 6, wherein when executed by the at least one processor, the instructions cause the at least one processor to:
- (a) read the component revocation list, said component revocation list being recorded on the information recording medium loaded in the drive; and
- (b) collate the component ID received from the component and the component revocation list based on the component revocation list read from the information recording medium.

8. The information processing apparatus of claim 6, wherein the revoked illegal component is a component that intervenes to acquire contents illegally.

9. The information processing apparatus of claim 6, wherein the component revocation list is received from a server.

10. The information processing apparatus of claim 1, wherein the component includes an additional component attribute, wherein said additional component attribute comprises a component category, a production time of the component, and a component version of compatible standards.

11. An information recording medium storing instructions structured to cause an apparatus to:
- (a) upon a different information recording medium being loaded into a drive, read data recorded on said different information recording medium, wherein a process permission component attribute decision list that includes a plurality of component attributes is stored on said different information recording medium, (b) receive a component ID from a component, said component being independent from the different information recording medium;

(c) determine whether a first component attribute of the component comprising information of whether only a hardware component is registered as one of the plurality of component attributes included in the attribute decision list stored on the different information recording medium, wherein if the first component attribute of the component is registered as one of the plurality of component attributes, output the read data recorded on said different information recording medium to the component;

(d) determine whether a second component attribute of the component comprising information of whether only a software component is registered as one of the plurality of component attributes included in the attribute decision list stored on the different information recording medium, wherein if the second component attribute of the component is registered as one of the plurality of component attributes, output the read data recorded on said different information recording medium to the component;

(e) determine whether a third component attribute of the component comprising information of whether both of a hardware component and a software component are registered as one of the plurality of component attributes included in the attribute decision list stored on the different information recording medium, wherein if the third component attribute of the component is registered as one of the plurality of component attributes, output the read data recorded on said different information recording medium to the component;

(f) determine whether a fourth component attribute of the component comprising information of a component maker; is registered as one of the plurality of component attributes included in the attribute decision list stored on the different information recording medium, wherein if the fourth component attribute of the component is registered as one of the plurality of component attributes, output the read data recorded on said different information recording medium to the component;

(g) determine whether a fifth component attribute of the component comprising information of a component model is registered as one of the plurality of component attributes included in the attribute decision list stored on the different information recording medium, wherein if the fifth component attribute of the component is registered as one of the plurality of component attributes, output the read data recorded on said different information recording medium to the component;

(h) determine whether a sixth component attribute of the component comprising information of a component version is registered as one of the plurality of component attributes included in the attribute decision list stored on the different information recording medium, wherein if the sixth component attribute of the component is registered as one of the plurality of component attributes, output the read data recorded on said different information recording medium to the component;

(i) determine whether a seventh component attribute of the component comprising information of a component category is registered as one of the plurality of component attributes included in the attribute decision list stored on the different information recording medium, wherein if the seventh component attribute of the component is registered as one of the plurality of component attributes, output the read data recorded on said different information recording medium to the component;

(j) determine whether a eighth component attribute of the component comprising information of a production time of the component is registered as one of the plurality of component attributes included in the attribute decision list stored on the different information recording medium, wherein if the eighth component attribute of the component is registered as one of the plurality of component attributes, output the read data recorded on said different information recording medium to the component; and (k) determine whether a ninth component attribute of the component comprising information of a component version of compatible standards is registered as one of the plurality of component attributes included in the attribute decision list stored on the different information recording medium, wherein if the ninth component attribute of the component is registered as one of the plurality of component attributes, output the read data recorded on said different information recording medium to the component.

12. An information processing method for executing authentication and data outputting process control to a component which attempts to perform a process of data read from an information recording medium, said component being independent from the information recording medium, said information processing method comprising:

a component authentication step executed by a drive in which an information recording medium on which output object data is recorded is loaded, wherein a process permission component attribute decision list that includes a plurality of component attributes is stored on said information recording medium; and a data outputting step of outputting the data read from the information recording medium from the drive to the component where the component authentication results in success, the component authentication step including:

(a) determining whether or not a first component attribute of the component comprising information of whether the any of the components is a hardware component or a software component is registered as one of the plurality of component attributes included in the attribute decision list stored on the information recording medium;

(b) if the first component attribute of the component is registered as one of the plurality of component attributes, outputting the read data recorded on said information recording medium to the component;

(c) determining whether a second component attribute of the component comprising a component maker is registered as one of the plurality of component attributes included in the attribute decision list stored on the information recording medium;

(d) if the second component attribute of the component is registered as one of the plurality of component attributes, outputting the read data recorded on said information recording medium to the component;

(e) determining whether a third component attribute of the component comprising a component model is registered as one of the plurality of component attributes included in the attribute decision list stored on the information recording medium;

(f) if the third component attribute of the component is registered as one of the plurality of component attributes, outputting the read data recorded on said information recording medium to the component;

(g) determining whether a fourth component attribute of the component comprising a component version is registered as one of the plurality of component attributes included in the attribute decision list stored on the information recording medium; and (h) if the fourth component attribute of the component is registered as one of the plurality of component attributes, outputting the read data recorded on said information recording medium to the component.

13. The information processing method of claim 12, which includes:
   (a) collating a component ID received from the component and IDs registered in the process permission component attribute decision list;
   (b) confirming, based on a result of the collation process, whether or not any of the attributes are registered in said process permission component attribute list; and
   (c) if any of the attributes of the component are registered in said process permission component attribute list, outputting the read data recorded on said information recording medium to the component.

14. The information processing method of claim 12, which includes:
   (a) receiving a certificate, which has a component ID stored therein and has an electronic signature added thereto, from the component;
   (b) executing a validity confirmation process of the certificate based on the electronic signature; and
   (c) executing the confirmation process of the attribute of the component based on the component ID acquired from the certificate whose validity is confirmed.

15. The information processing method of claim 12, which includes determining whether a fifth attribute of the component is registered as one of the plurality of component attributes included in the attribute decision list stored on the information recording medium, wherein said fifth component comprises one of:
   (a) information of whether only a hardware component is set as the data process permission component attribute;
   (b) information of whether only a software component is set as the data process permission component attribute; and
   (c) information whether both of a hardware component and a software component are set as the data process permission component attributes.

16. The information processing method of claim 12, which includes:
   (a) determining whether or not a fifth component attribute comprising information of whether the component is a hardware component for exclusive use which belongs to a particular category; and
   (b) execute a successful authentication process if the component is the hardware component for exclusive use.

17. The information processing method of claim 12, which includes:
   (a) collating a component ID received from the component and a component revocation list as a list of illegal components; and
   (b) executing a revoke confirmation process of confirming whether or not the component is a revoked illegal component.

18. The information processing method of claim 17, which includes:

(a) reading the component revocation list, said component revocation list being recorded on the information recording medium loaded in the drive; and
(b) collating the ID collation process based on the component revocation list read from the information recording medium.

19. The information processing method of claim 17, wherein the revoked illegal component is a component that intervenes to acquire contents illegally.

20. The information processing method of claim 17, wherein the component revocation list is received from a server.

21. The information processing method of claim 12, wherein the component includes an additional component attribute, wherein said additional component attribute comprises a component category, a production time of the component, and a component version of compatible standards.

22. A computer readable medium storing a computer program for executing authentication of and data outputting process control to a component which attempts to perform a process of data read from an information recording medium, said component being independent from the information recording medium, the computer program executable on an information processing apparatus, comprising:

a component authentication step executed by a drive in which an information recording medium on which output object data is recorded is loaded, wherein a process permission component attribute decision list that includes a plurality of component attributes is stored on said information recording medium; and a data outputting step of outputting the data read from the information recording medium from the drive to the component where the component authentication results in success, the component authentication step including:

(a) determining whether or not a first component of the component comprising information of whether the component is a hardware component or a software component is registered as one of the plurality of component attributes included in the attribute decision list stored on the information recording medium, if the first component attribute of the component is registered as one of the plurality of component attributes, outputting the read data recorded on said information recording medium to the component;

(b) determining whether a second component attribute of the component comprising information of a component maker is registered as one of the plurality of component attributes included in the attribute decision list stored on the information recording medium, if the second component attribute of the component is registered as one of the plurality of component attributes, outputting the read data recorded on said information recording medium to the component;

(c) determining whether a third component attribute of the component comprising information of a component model is registered as one of the plurality of component attributes included in the attribute decision list stored on the information recording medium, if the third component attribute of the component is registered as one of the plurality of component attributes, outputting the read data recorded on said information recording medium to the component; and (d) determining whether a fourth component attribute of the component comprising information of a component version is registered as one of the plurality of component attributes included in the attribute decision list stored on the information recording medium, if the fourth component attribute of the component is registered as one of the plurality of component attributes, outputting the read data recorded on said information recording medium to the component.

23. The computer readable medium storing a computer program of claim 22, wherein the component includes an additional component attribute, wherein said additional component attribute comprises a component category, a production time of the component, and a component version of compatible standards.

* * * * *